United States Patent
Nishiyama et al.

(10) Patent No.: US 6,929,959 B2
(45) Date of Patent: Aug. 16, 2005

(54) MANUFACTURING METHOD OF CPP TYPE MAGNETIC SENSOR HAVING CURRENT-SQUEEZING PATH

(75) Inventors: Yoshihiro Nishiyama, Niigata-ken (JP); Masamichi Saito, Niigata-ken (JP); Daigo Aoki, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 5 days.

(21) Appl. No.: 10/828,120

(22) Filed: Apr. 20, 2004

(65) Prior Publication Data

US 2004/0214353 A1 Oct. 28, 2004

(30) Foreign Application Priority Data

Apr. 23, 2003 (JP) ......................................... 2003-117751

(51) Int. Cl.[7] .............................................. H01L 21/00
(52) U.S. Cl. ........................ 438/3; 438/3; 438/945; 438/950; 438/701
(58) Field of Search .............................. 438/3, 57, 701, 438/718, 717, 950, 945

(56) References Cited

U.S. PATENT DOCUMENTS

| | | | |
|---|---|---|---|
| 6,181,532 B1 | 1/2001 | Dovek et al. | 360/321 |
| 6,353,318 B1 | 3/2002 | Sin et al. | 324/252 |
| 6,421,212 B1 | 7/2002 | Gibbons et al. | 360/327.31 |
| 2002/0135955 A1 | 9/2002 | Ono et al. | |
| 2002/0145567 A1 | 10/2002 | Spiegel et al. | 343/700 |
| 2002/0145835 A1 | 10/2002 | Suzuki et al. | |
| 2004/0061982 A1 * | 4/2004 | Lin et al. | 360/324.1 |

FOREIGN PATENT DOCUMENTS

| | | |
|---|---|---|
| DE | 201 06 005 | 8/2001 |
| DE | 203 01 187 | 4/2003 |
| EP | 0 953 849 A2 | 11/1999 |
| EP | 0 997 974 | 5/2000 |
| EP | 1 294 049 | 3/2003 |
| JP | 11-316919 | 11/1999 |
| JP | 2003078186 | 3/2003 |

OTHER PUBLICATIONS

Copy of Search Report dated Nov. 11, 2004 for European Patent Application No. EP 04 02 0885.

* cited by examiner

Primary Examiner—Caridad Everhart
(74) Attorney, Agent, or Firm—Brinks Hofer Gilson & Lione

(57) ABSTRACT

On a multilayer film formed on a lower electrode layer, a resist layer having cutaway parts at a lower portion is formed, and on parts of the upper surface of the multilayer film which are not overlapped with the resist layer except for areas inside the cutaway parts, first gap layers are formed. Accordingly, a predetermined gap T1 can be formed between the first gap layers in the track width direction. Next, in the following step, two end surfaces of the multilayer film and the first gap layers in the track width direction are milled. Hence, according to the present invention, compared to the case in the past, the predetermined gap T1 provided between the first gap layers can be formed into a minute size with superior accuracy, the current path-squeezing structure can be easily formed, and a magnetic sensor having superior change in resistance ($\Delta R$) and reproduction output can be manufactured.

14 Claims, 10 Drawing Sheets

MANUFACTURING METHOD OF CPP TYPE MAGNETIC SENSOR HAVING CURRENT-SQUEEZING PATH

This application claims the benefit of priority to Japanese Patent Application No. 2003-117751, herein incorporated by reference.

BACKGROUND OF THE INVENTION

1. Field of the Invention

The present invention relates to methods for manufacturing a magnetic sensor having electrode layers provided on an upper and a lower side of a multilayer film exhibiting a magnetoresistance effect, and more particularly, relates to a method for manufacturing a magnetic sensor which can easily and accurately form a current path-squeezing structure in which a current path flowing through the multilayer film is squeezed.

2. Description of the Related Art

In a current perpendicular to the plane (CPP) type magnetic sensor in which individual layers, that is, a free magnetic layer, non-magnetic conductive layer, a fixed magnetic layer, and an antiferromagnetic layer are laminated to each other in the thickness direction, and in which current flows in the direction perpendicular to the film surface of this multilayer film, it has been understood that unless the total film thickness of the multilayer film is increased, and an area (hereinafter referred to as "element size") of the film surface of the multilayer film is decreased, the change in resistance ($\Delta R$) and the reproduction output cannot be effectively increased, and that the magnetic sensor described above cannot be used in practice.

The current photolithographic technique has a limitation of decreasing the area of the film surface of the multilayer film. In addition, when the total thickness is increased, the gap length is increased, and as a result, there has been a problem in that the reproduction properties may be degraded in some cases.

Hence, in order to improve the change in resistance ($\Delta R$), methods have been disclosed in several documents in which a current path flowing through the multilayer film is squeezed by a member provided in addition to the multilayer film.

FIG. 15 is a copy of the structure of a magnetic sensor in a manufacturing step shown in FIG. 7 of U.S. Pat. No. 6,353,318 B1 and is a partial cross-sectional view of the magnetic sensor when it is viewed from a face facing a recording medium.

Reference numeral 1 indicates a lower electrode layer, and on the lower electrode layer 1, a multilayer film 2 exhibiting a magnetoresistance effect is formed. On the multilayer film 2, a resist layer 3 is provided, and two end surfaces 2a of the multilayer film 2 in a track width direction (X direction in the figure) which are not overlapped with the resist layer 3 are milled to form inclined surfaces.

As shown in FIG. 15, on the two end surfaces 2a of the multilayer film 2, lower insulating layers (lower insulator) 4 are formed. The lower insulators 4 are also formed inside cutaway parts 3a formed in both sides of a lower portion 3c of the resist layer 3 in the track width direction and are arranged on an upper surface 2b of the multilayer film 2 with a predetermined gap 4a therebetween in the track width direction (X direction in the figure).

A layer indicated by reference numeral 5 on the lower insulator 4 is an underlayer, reference numeral 6 indicates a permanent magnetic layer, and an inside front portion of an upper insulating layer (upper insulator) 7 formed on the permanent magnetic layer 6 extends inside the cutaway part 3a of the resist layer 3 so as to overlap the lower insulator 4.

As for the magnetic sensor shown in FIG. 15, first, on the entire surface of the lower electrode layer 1, the multilayer film 2 is formed; the resist layer 3 is then formed on an optional position of the multilayer film 2; the two end surfaces 2a of the multilayer film 2 which are not overlapped with the resist layer 3 are milled; and on each of the two end surfaces 2a, the lower insulator 4, the underlayer 5, the permanent magnetic layer 6, and the upper insulator 7 are sequentially formed. Next, the resist layer 3 is removed, and over the upper insulators 7 to the multilayer film 2 exposed through the gap 4a provided between the lower insulators 4, an upper electrode layer (not shown in the figure) is formed.

In the method for manufacturing a magnetic sensor described in U.S. Pat. No. 6,353,318 B1, as shown in FIG. 15, the lower insulators 4 can be disposed on the upper surface 2b of the multilayer film 2 with the predetermined gap 4a therebetween in the track width direction.

Accordingly, it has been believed that a path of current flowing through the multilayer film 2 is the width region of the gap 4a provided between the lower insulators 4 on the upper surface 2a of the multilayer film 2, and that squeezing of the current can be appropriately performed.

However, According to U.S. Pat. No. 6,353,318 B1, the formation of the lower insulators 4 is performed after the end surfaces 2a of the multilayer film 2 are milled. Accordingly, since a magnetic powder is generated when the multilayer film 2 is milled and then adheres to the peripheries of an upper portion 3b and a lower portion 3c of the resist layer 3, due to this adhesion of the magnetic powder, the space in the cutaway part 3a is decreased. Alternatively, when the lower insulators 4 are formed, the magnetic powder described above adheres to the periphery of the upper portion 3b of the resist layer 3, and as a result, the shadow effect is enhanced. Consequently, it becomes difficult to appropriately form the lower insulators 4 inside the cutaway parts 3a.

The lower insulator 4 is formed, for example, by sputtering at an angle inclined with respect to the direction perpendicular to the surface of a substrate (not shown in the figure); however, since the space inside the cutaway part 3a is decreased, and/or the shadow effect is enhanced, even when the film formation is performed by sputtering along an inclined direction, the length of the lower insulator 4 provided on the upper surface 2b of the multilayer film 2 is decreased. That is, the gap 4a provided between the lower insulators 4 is increased, and as a result, a current-squeezing structure cannot be effectively realized. In addition, the thickness of the lower insulator 4 provided on the upper surface 2a of the multilayer film 2 is liable to be decreased as compared to a predetermined dimension. According to the related technique shown in FIG. 15, since the upper insulator 7 is further provided on the lower insulator 4 which is formed on the upper surface 2a of the multilayer film 2, it may be believed that the insulation between the multilayer film 2 and the upper electrode layer except for the gap 4a provided between the lower insulators 4 can be ensured by the two layers described above. However, in practice, at the stage prior to the formation of the upper insulator 7, since the same material layers as the lower insulator 4, the underlayer 5, and the permanent magnetic layer 6 adhere to the periphery of the resist layer 3, the space in the cutaway part 3a of the resist layer 3 is further decreased, and the shadow effect is also further enhanced. Hence, the formation of the upper insulator 7 extending inside the cutaway part 3a is more difficult than the formation of the lower insulator 4 extending along the upper surface 2b of the multilayer film 2, and it is believed that except for the gap 4a provided between the lower insulators 4, the insulation between the multilayer film 2 and the upper electrode layer is significantly decreased. In view of the points described above, the method for manufacturing a magnetic sensor, shown in FIG. 15, cannot effectively form the current path-squeezing structure.

Next, FIG. 16 is a copy of the structure of a magnetic sensor in a manufacturing step shown in FIG. 10 of U.S. Pat. No. 6,421,212 B1 and is a partial cross-sectional view of the magnetic sensor when it is viewed from a face facing a recording medium. FIG. 16 shows only around the right side region of the magnetic sensor in a manufacturing step. FIG. 17 is a partial cross-sectional view of a magnetic sensor in a manufacturing step when it is viewed from a face facing a recording medium. The magnetic sensor mentioned above is not shown in U.S. Pat. No. 6,421,212 B1; however, in consideration of the description thereof, it is believed that the magnetic sensor in a manufacturing step following the step shown in FIG. 16 is in the state as shown in FIG. 17. As FIG. 16, FIG. 17 also shows only around the right side region of the magnetic sensor in a manufacturing step.

Reference numeral 10 indicates a substrate, a lower electrode layer 11 is formed on the substrate 10, a multilayer film 12 exhibiting a magnetoresistance effect is formed on the lower electrode layer 11, and a protective layer 13 is formed on the multilayer film 12. The protective layer 13 is formed of an inorganic insulating material such as $Al_2O_3$ or $SiO_2$.

As shown in FIG. 16, on the protective layer 13, a resist layer 17 is formed. As shown in FIG. 16, the two end surfaces 14 of the lower electrode layer 11, the multilayer film 12, and the protective layer 13 are milled, insulating layers 15 are formed over the two end surfaces 14 to the substrate 10. In addition, on the insulating layers 15, bias layers 16 are formed.

For forming the magnetic sensor in the state shown in FIG. 16, after the lower electrode layer 11, the multilayer film 12, and the protective layer 13 are first formed on the substrate 10, the resist layer 17 is formed by exposure and development on the protective layer 13 so as to have a predetermined shape, and the two end surfaces 14 of the lower electrode layer 11, the multilayer 12, and the protective layer 13, which are not overlapped with the resist layer 17 are milled. Subsequently, the insulating layers 15 are formed over the two end surfaces 14 to the substrate 10, and on the insulating layers 15, the bias layers 16 are formed.

In the step shown in FIG. 17, in order to form an opening portion (gap) for supplying current into the multilayer film 12 from an upper electrode layer (not shown in the figure), for example, a resist layer 18 is formed on the protective layer 13, and an opening portion 18a is formed in the resist layer 18 located on the center of the protective layer 13 by exposure and development. Next, the protective layer 13 exposed through this opening portion 18a is removed by etching or the like as shown by a dotted line to form a opening portion 13a in the protective layer 13, and the upper surface of the multilayer film 12 is exposed through this opening portion 13a. The region of the upper surface of the multilayer film 12 thus exposed is to be used as a current path.

According to the magnetic sensor described in U.S. Pat. No. 6,421,212 B1, the protective layer 13 is formed on the multilayer film 12 beforehand, and the opening portion 13a is formed in the protective layer 13 in a subsequent step so that the current pass-squeezing structure is realized for the multilayer film 12.

However, according to the method for manufacturing a magnetic sensor, shown in FIGS. 16 and 17, when the opening portion 13a is provided in the protective layer 13, etching therefor has influence on the multilayer film 12 present under the protective layer 13, and as a result, the upper surface of the multilayer film 12 may be damaged with a high probability.

In addition, since the resist layer 17 in the step shown in FIG. 16 is removed, and subsequently, the resist layer 18 is again formed, the alignment accuracy for forming the opening portion 18a in the resist layer 18 is decreased, and as a result, a problem may arise in that the opening portion 13a cannot be formed at a predetermined position of the protective layer 13. In addition, due to the limitation of photolithographic techniques, it is extremely difficult to form a minute opening portion 18a in the resist layer 18 with high accuracy.

SUMMARY OF THE INVENTION

Accordingly, the present invention was made to solve the problems described above, and in particular, an object of the present invention is to provide a method for manufacturing a magnetic sensor, which can easily and accurately form a squeezing structure of the current path.

According to the present invention, a method for manufacturing a magnetic sensor which has a multilayer film exhibiting a magnetoresistance effect, a lower electrode layer provided at a lower side of the multilayer film, and an upper electrode layer provided at an upper side of the multilayer film, comprises the steps of: (a) forming the multilayer film at the upper side of the lower electrode layer; (b) forming first gap layers, having a predetermined gap provided therebetween in a track width direction, on the upper surface of the multilayer film; (c) milling the two sides of the multilayer film and the first gap layers in the track width direction so as to enable the multilayer film and the first gap layers to have predetermined shapes; and (d) forming the upper electrode layer on the first gap layers and in the predetermined gap.

In the method for manufacturing a magnetic sensor, according to the present invention, in the step (b), on the upper surface of the multilayer film formed at the upper side of the lower electrode layer, the first gap layers provided with a predetermined gap therebetween in the track width direction are first formed. That is, unlike the related technique shown in FIG. 15, the lower insulators 4 are not formed after the two end surfaces 2a of the multilayer film 2 are milled. In addition, unlike the related technique shown in FIGS. 16 and 17, after the protective layer 13 is formed, the opening portion 13a is not formed in the protective layer 13 in a subsequent step, and the first gap layers is formed on the multilayer film with a predetermined gap therebetween in the track width direction from the beginning.

In the step (c) described above, the two end surfaces of the multilayer film and the first gap layers in the track width direction are milled. Accordingly, unlike the related technique described in FIG. 15, when the first gap layers are formed, the problem of adhesion of a magnetic powder will not occur which is caused by milling of the two end surfaces of the multilayer film. In addition, unlike the related technique shown in FIGS. 16 and 17, an opening portion extending to the multilayer film is not formed in the first gap layer after the formation of the first gap layer, and hence the problem in that the upper surface of the multilayer film is damaged by etching also will not occur.

Hence, in the method for manufacturing a magnetic sensor, according to the present invention, compared to the case in the past, a predetermined gap having a small size can be formed between the first gap layers with superior accuracy, the squeezing structure for squeezing a current path can be easily formed, and a magnetic sensor having a large change in resistance (ΔR) and high reproduction output can be manufactured.

In addition, according to the present invention, in the step (c) described above, it is preferable that a mask layer having a predetermined width dimension in the track width direction be provided on the first gap layers and in the gap, that parts of the first gap layers and the multilayer film in the track width direction, which are not overlapped with the mask layer, be milled, and that the mask layer be then removed. As is the present invention, when the two end surfaces of the first gap layers and the multilayer film are milled using the mask layer in the step (c), the multilayer film and the first gap layers are each easily defined to have a predetermined shape.

In addition, in the present invention, the step (b) and the step (c) are preferably performed using the same mask.

In the case described above, it is preferable that the mask layer is composed of an upper portion and a lower portion, that two cutaway parts be provided at the two sides of the lower portion in the track width direction, and that the width dimension of the lower portion in the track width direction be smaller than that of the upper portion in the track width direction.

In the step (b), it is preferable that the mask layer be formed on the upper surface of the multilayer film, and that the first gap layers be formed on parts of the multilayer film which are not overlapped with the mask layer except for areas inside the cutaway parts. Accordingly, the predetermined gap is provided between the first gap layers due to the presence of the lower portion of the mask layer.

In the step (c), parts of the first gap layers and the multilayer film in the track width direction, which are not overlapped with the upper portion of the mask layer, are preferably milled.

According to the steps described above, the step (b) and the step (c) may be performed using the same mask layer. Since the formation of the first gap layers and the milling of the two end surfaces of the multilayer film and the first gap layers can be performed by using the same mask layer, the manufacturing process can be remarkably simplified, and in addition, the formation of the first gap layers and the milling of the two end surfaces of the multilayer film and the first gap layers can be performed with high accuracy using a so-called self-alignment technique.

Alternatively, according to the present invention, the step (b) may be performed using a mask layer different from that for the step (c).

In the case described above, it is preferable that a first mask layer used in the step (b) be composed of a lower portion and an upper portion, that two cutaway parts be provided at the two sides of the lower portion in the track width direction, and that the width dimension of the lower portion in the track width direction be smaller than that of the upper portion in the track width direction.

In the step (b), it is preferable that the first mask layer be formed on the upper surface of the multilayer film, that the first gap layers be formed on parts of the multilayer film which are not overlapped with the first mask layer except for areas inside the cutaway parts, thereby the predetermined gap being provided between the first gap layers due to the presence of the lower portion of the mask layer, and that the first mask layer be then removed.

Subsequently, in the step (c) described above, it is preferable that a second mask layer be provided on the first gap layers and in the gap therebetween, the second mask layer having a width dimension in the track width direction larger than that of the lower portion of the first mask layer in the track width direction and smaller than that of the upper portion thereof, parts of the first gap layers and the multilayer film in the track width direction, which are not overlapped with the second mask layer in the track width direction, be milled, and that the second mask layer be then removed.

The step (b) and the step (c) may be performed using different mask layers from each other. The second mask layer used in the step (c) has a width dimension in the track width direction smaller than that of the upper portion of the first mask layer in the track width direction which is used in the step (b). Accordingly, the width dimension in the track width direction of the multilayer film obtained by milling the two end surfaces thereof using the second mask layer in the step (c) can be small as compared to that obtained in the case in which the two end surfaces of the multilayer film are milled with the mask layer which is used in both the step (b) and the step (c).

Since the width dimension of the multilayer film in the track width direction can be decreased, an optical track width (Opti-Tw) can be decreased, and as a result, even when the current path spreads wider in the multilayer film than the gap formed between the first gap layers, narrowing of the magnetic track width (Mag-Tw) can be realized.

In addition, in the method for manufacturing a magnetic sensor, according to the present invention, the lower portion and the upper portion of the mask layer are preferably formed from different types of resists, and in particular, a resist for the lower portion of the mask layer is preferably formed of a material having a faster development speed than that of a resist for the upper portion. Accordingly, the cutaway parts can be formed in the lower portion of the resist layer in the track width direction, and hence the width dimension of the lower portion of the resist layer in the track width direction can be smaller than that of the upper portion thereof.

As a result, the predetermined gap provided between the first gap layers in the track width direction can be effectively decreased, and the structure in which the current path is further squeezed can be realized.

In addition, according to the present invention, between the step (c) and the step (d), gap layers different from the first gap layers are preferably formed on the two sides of the multilayer film and the first gap layers in the track width direction.

In addition, according to the present invention, between the step (c) and the step (d), it is preferable that second gap layers be formed on the two sides of the multilayer film and the first gap layers in the track width direction, that bias layers and third gap layers be formed on the second gap layers, and that the upper electrode layer provided on the first gap layers and in the predetermined gap therebetween be formed in the step (d) to extend on the third gap layers.

In addition, according to the present invention, between the step (c) and the step (d), it is preferable that the second gap layers, the bias layers, and the third gap layers be formed sequentially using a mask layer for defining the multilayer film to have a predetermined shape. Accordingly, the second gap layers, the third gap layers, and the bias layers can be easily and accurately formed at a predetermined position with superior alignment accuracy.

DESCRIPTION OF THE PREFERRED EMBODIMENTS

Figure 1:
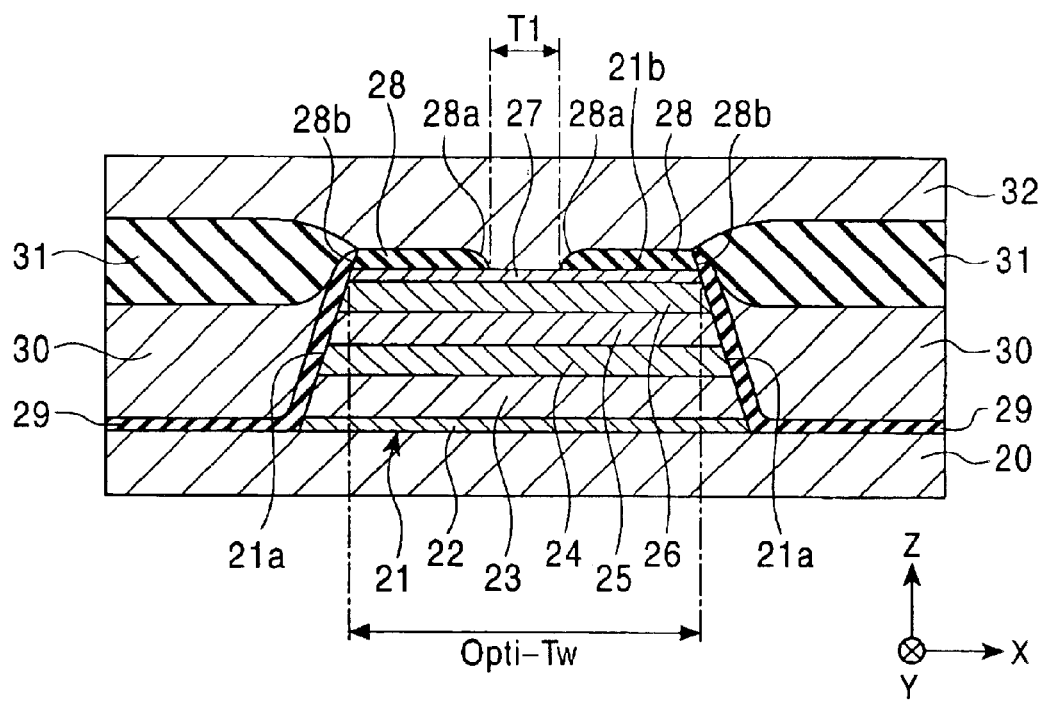
FIG. 1 is a partial cross-sectional view of a magnetic sensor according to an embodiment of the present invention, the magnetic sensor being taken along a parallel direction to a face opposing a recording medium and being viewed therefrom.

FIG. 1 is a partial cross-sectional view of a magnetic sensor of an embodiment according to the present invention, the magnetic sensor being taken along a parallel direction (direction parallel to an X-Y face) to a face facing a recording medium and being viewed therefrom.

The magnetic sensor shown in FIG. 1 is a GMR head for reproducing external signals recorded on a recording medium. Although not shown in the figure, an inductive head used for recording may be provided on this magnetic sensor.

In this embodiment, a "track width direction" indicates the direction parallel to the X direction shown in the figure, and this direction is a width direction of a region in which a magnetization direction is varied by an external magnetic field and, for example, is a magnetization direction of a free magnetic layer when an external magnetic field is not applied. In addition, a "height direction" indicates the direction parallel to the Y direction shown in the figure and coincides with the direction of a leak magnetic field from a recording medium, and the Z direction shown in the figure indicates a traveling direction of a recording medium.

In addition, when the magnetic sensor is used for a floating type magnetic head, a "face facing a recording medium" indicates a so-called ABS surface (Air Bearing Surface).

The magnetic sensor shown in FIG. 1 is provided on a trailing end surface of a slider formed, for example, of alumina-titanium carbide ($Al_2O_3$—TiC). The slider is bonded to an elastically deformable support member made of stainless steel or the like at the side opposite to the face facing a recording medium, thereby forming a magnetic head device.

Reference numeral 20 shown in FIG. 1 indicates a lower shield layer made of a magnetic material such as a NiFe alloy. The lower shield layer 20 is also used as a lower electrode layer.

On the center of the lower shield layer 20 shown in FIG. 1, a multilayer film 21 is formed.

The multilayer film 21 is formed of a seed layer 22, an antiferromagnetic layer 23, a fixed magnetic layer 24, a non-magnetic material layer 25, a free magnetic layer 26, and a protective layer 27 laminated to each other in that order from the bottom.

The seed layer 22 is formed, for example, of a NiFe alloy, a NiFeCr alloy, or Cr. By forming the seed layer 22 described above, crystal grain diameters along the direction parallel to the film surfaces of the individual layers formed on the seed layer can be increased. Hence, the reliability in voltage application, such as electromigration resistance, the rate ($\Delta R/R$) of change in resistance, or the like, can be appropriately improved.

The antiferromagnetic layer 23 is preferably formed of an antiferromagnetic material containing Mn and element X (where X is at least one of Pt, Pd, Ir, Rh, Ru, and Os). Alternatively, the antiferromagnetic layer 23 is preferably formed of an antiferromagnetic material containing Mn and element X' (where X' is at least one of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Sn, Hf, Ta, W, Re, Au, Pb, and a rare earth element).

Those antiferromagnetic materials each have superior corrosion resistance and a high blocking temperature and can generate a large exchange coupling magnetic field at the interface formed with the fixed magnetic layer 24 described below. In addition, the antiferromagnetic layer 23 is preferably formed to have a thickness in the range of from 80 to 300 Å.

Next, the fixed magnetic layer 24 has a single-layer or a multilayer structure composed of magnetic materials such as a NiFe alloy, a CoFe alloy, and a CoFeNi alloy. More preferably, the fixed magnetic layer 24 has a three-layer ferrimagnetic structure composed of two magnetic layers and a non-magnetic interlayer of Ru or the like provided therebetween. In the case of the laminate ferrimagnetic structure, the magnetizations of the two magnetic layers forming the fixed magnetic layer 24 are fixed antiparallel to each other (in this case, the magnetization of one of the two magnetic layers is fixed in the Y direction in the figure, and the magnetization of the other layer is fixed in the direction opposite to the Y direction).

The non-magnetic material layer 25 is formed of a conductive material, such as Cu, having a low electric resistance. The non-magnetic material layer 25 is formed to have a thickness of approximately 25 Å.

Next, the free magnetic layer 26 has a single-layer structure or a multilayer structure composed of magnetic materials such as a NiFe alloy, a CoFe alloy, and a CoFeNi alloy. The free magnetic layer 26 is preferably formed to have a total thickness of approximately 20 to 100 Å.

The free magnetic layer 26 may have the laminate ferrimagnetic structure described above. In the case described above, the two magnetic layers forming the free magnetic layer 26 are magnetized in an antiparallel state (in this case, one of the two magnetic layers is magnetically fixed in the X direction in the figure, and the other layer is fixed in the direction opposite to the X direction); however, unlike the fixed magnetic layer 24, the free magnetic layer is put in a weak single domain state, that is, the magnetization thereof is easily varied in response to an external magnetic field. In addition, when an external magnetic field is not applied, the magnetization of the free magnetic layer 26 is approximately perpendicular to the fixed magnetization direction of the fixed magnetic layer 24.

The protective layer 27 provided on the free magnetic layer 26 is formed of a non-magnetic material such as Ta, Ru, or Cu. In addition, the protective layer 27 may be formed of an insulating material such as $Al_2O_3$ or $SiO_2$; however, in this case, it is necessary that the protective layer 27 be formed to have a small thickness so that current flowing between the upper shield layer and the lower shield layer 20 is not blocked by the protective layer 27. The thickness of the protective layer 27 is preferably formed in the range of from 20 to 300 Å.

In the magnetic sensor shown in FIG. 1, the two end surfaces 21a of the multilayer film 21 in the track width direction (X direction in the figure) are each formed to have an inclined surface or a warped surface so that the width dimension of the multilayer film 21 in the track width direction is gradually increased toward the lower side.

As shown in FIG. 1, first gap layers 28 are provided at two sides on an upper surface 21b of the multilayer film 21 so as to face each other with a predetermined gap T1 provided therebetween, the predetermined gap T1 being placed at an approximately central position of the upper surface 21b. The first gap layers 28 are formed of an insulating material such as $Al_2O_3$ or $SiO_2$. In addition, the thickness of the first gap layer 28 is in the range of from 20 to 100 Å. In this embodiment, the thickness of the first gap layer 28 indicates the maximum thickness thereof.

As shown in FIG. 1, an inside front portion 28a of the first gap layer 28 in the track width direction has a warped surface so that the gap T1 is gradually increased toward the upper side. The reason the inside front portion 28a has a warped surface is because of a manufacturing method which will be described later.

The gap T1 between the first gap layers 28 shown in FIG. 1 is approximately 30 to 50 nm as the minimum width dimension.

As shown in FIG. 1, end surfaces 28a of the first gap layers 28 in the track width direction have surfaces continuously connected to the respective two end surfaces 21a of the multilayer film 21.

As shown in FIG. 1, over the two end surfaces 21a of the multilayer film 21, the end surfaces 28a of the first gap layers 28, and the lower shield layer 20 extending to the two sides in the track width direction further from the two end surfaces 21a, second gap layers 29 are formed. The second gap layers 29 are formed of an insulating material such as $Al_2O_3$ or $SiO_2$.

As shown in FIG. 1, on the second gap layers 29, hard bias layers 30 composed of a hard magnetic material such as CoPt or CoCrPt are provided. In addition, on the hard bias layers 30, third gap layers 31 composed of an insulating material such as $Al_2O_3$ or $SiO_2$ are formed. That is, the hard bias layers 30 are each provided between the second gap layer 29 and the third gap layer 31.

As shown in FIG. 1, over the third gap layers 31, the first gap layers 28, and the upper surface 21b of the multilayer film 21 exposed through the gap T1 provided between the first gap layers 28, an upper shield layer 32 is formed. The upper shield layer 32 is formed of a magnetic material such as a NiFe alloy. The upper shield layer 32 is also used as an upper electrode layer.

The magnetic sensor shown in FIG. 1 is formed so that the lower shield layer 20 and the upper shield layer 32, which function as electrodes, are in contact with the top and the bottom of the multilayer film 21, respectively, and has a so-called CPP type structure in which current flowing between the shield layers 20 and 32 passes through the multilayer film 21 along the direction (Z direction in the figure) perpendicular to the film surface.

In the embodiment shown in FIG. 1, on the multilayer film 21, the first gap layers 28 are formed, and by the gap T1 provided between the first gap layers 28, the current path is squeezed.

In FIG. 1, the track width Tw is determined by the width dimension in the track width direction of the upper surface of the free magnetic layer 26 which forms the multilayer film 21. This track width Tw is a physical width and is called an optical track width (Opti-Tw).

In addition, a region in the free magnetic layer 26, in which the magnetization varies in response to an external magnetic field to generate a magnetoresistance effect and through which current flowing between the shield layers 20 and 32 passes, is called a magnetic track width (Mag-Tw).

In the embodiment shown in FIG. 1, when the first gap layers 28 with the gap T1 provided at the center therebetween are provided on the upper surface 21b of the multilayer film 21 so that the current path is squeezed, the magnetic track width Mag-Tw can be decreased. As a result, the change in resistance ($\Delta R$) and the reproduction output can be appropriately improved.

In order to decrease the magnetic track width Mag-Tw, it is also preferable that the optical track width Opti-Tw itself be small. The reason for this is as follows. Even when the current path is squeezed by the gap T1 provided between the first gap layers 28, when the current flowing through the multilayer film 21 spreads and flows therein, the magnetic track width Mag-Tw is also increased in response to the spread; hence, by decreasing the optical track width Opti-Tw itself, the spread of the magnetic track width Mag-Tw is suppressed.

The optical track width Opti-Tw is preferably in the range of from 0.05 to 0.15 $\mu$m.

In the embodiment shown in FIG. 1, since the gap layers 29 and 31 are provided on the top and the bottom of the hard bias layers 30 formed at the two sides of the multilayer film 21 in the track width direction, the current flowing between the shield layers 20 and 32 via the multilayer film 21 is not shunted into the hard bias layers 30, and hence the improvement in reproduction output can be appropriately achieved.

In the embodiment shown in FIG. 1, the end surfaces 21a of the multilayer film 21 are each entirely formed from the bottom surface thereof to the upper surface 21b; however, for example, at least a part of the antiferromagnetic layer 23 forming the multilayer film 21 may extend in the track width direction further from the two end surfaces 21a of the individual layers formed on the antiferromagnetic layer 23.

In addition, in the embodiment shown in FIG. 1, the antiferromagnetic layer 23, the fixed magnetic layer 24, the non-magnetic material layer 25, and the free magnetic layer 26 are laminated to each other in that order from the bottom; however, those layers may be laminated to each other in the order opposite to that described above.

In addition, in the embodiment shown in FIG. 1, the hard bias layers 30 are provided at the two sides of the multilayer film 21 in the track width direction, and the magnetization of the free magnetic layer 26 is placed in a single domain state in the track width direction by a vertical bias magnetic field from the hard bias layers 30; however, a method for placing the free magnetic layer 26 in a single domain state is not limited to the hard bias method, and for example, a method in which a uniaxial anisotropy is imparted to the free magnetic layer 26 by ion implantation or the like and an exchange bias method may also be used. In the case described above, the formation of the hard bias layers 30 at the two sides of the multilayer film 21 becomes unnecessary, and the insulation between the lower shield layer 20 and the upper shield layer 32 may be ensured by forming single-layer gap layers at the two sides of the multilayer film 21.

The magnetic sensor shown in FIG. 1 is formed by the following method. The manufacturing steps shown in FIGS. 2 to 6 collectively show a flow chart of a first manufacturing method according to the present invention, and each figure is a partial cross-sectional view of the magnetic sensor in the manufacturing step when it is viewed from a face facing a recording medium.

Figure 2:
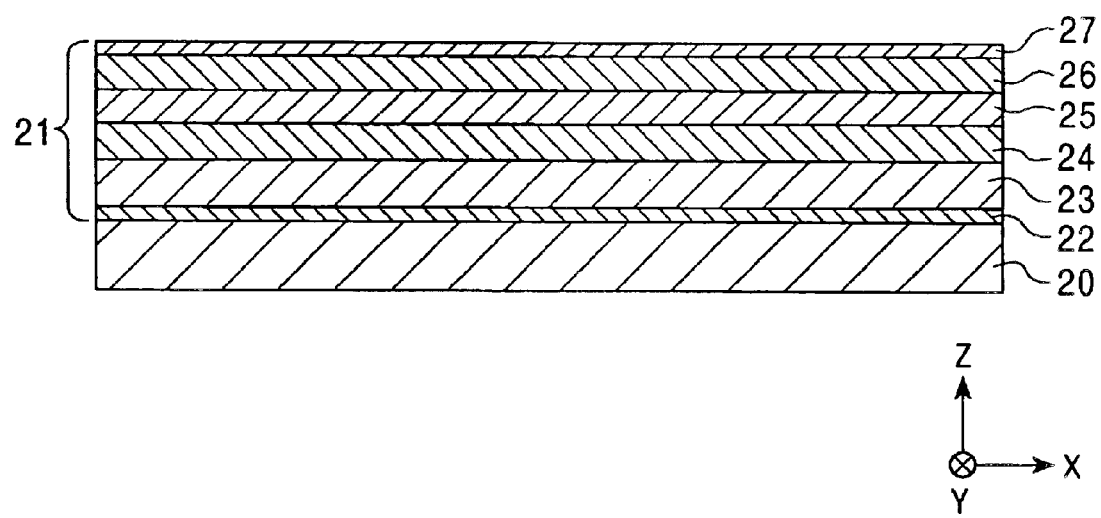
FIG. 2 is a partial cross-sectional view showing a first method for manufacturing the magnetic sensor shown in FIG. 1.

In the step shown in FIG. 2, on the entire surface of the lower shield layer 20 of a magnetic material such as a NiFe alloy is formed the seed layer 22, the antiferromagnetic layer 23, the fixed magnetic layer 24, the non-magnetic material layer 25, the free magnetic layer 26, and the protective layer 27 in that order from the bottom. The materials for the individual layers are those as described with reference to FIG. 1. In addition, the individual layers are formed by a sputtering method, a deposition method, and the like. In FIG. 2, the multilayer film 21 is shown which is formed of the layers from the seed layer 22 through the protective layer 27.

Figure 3:
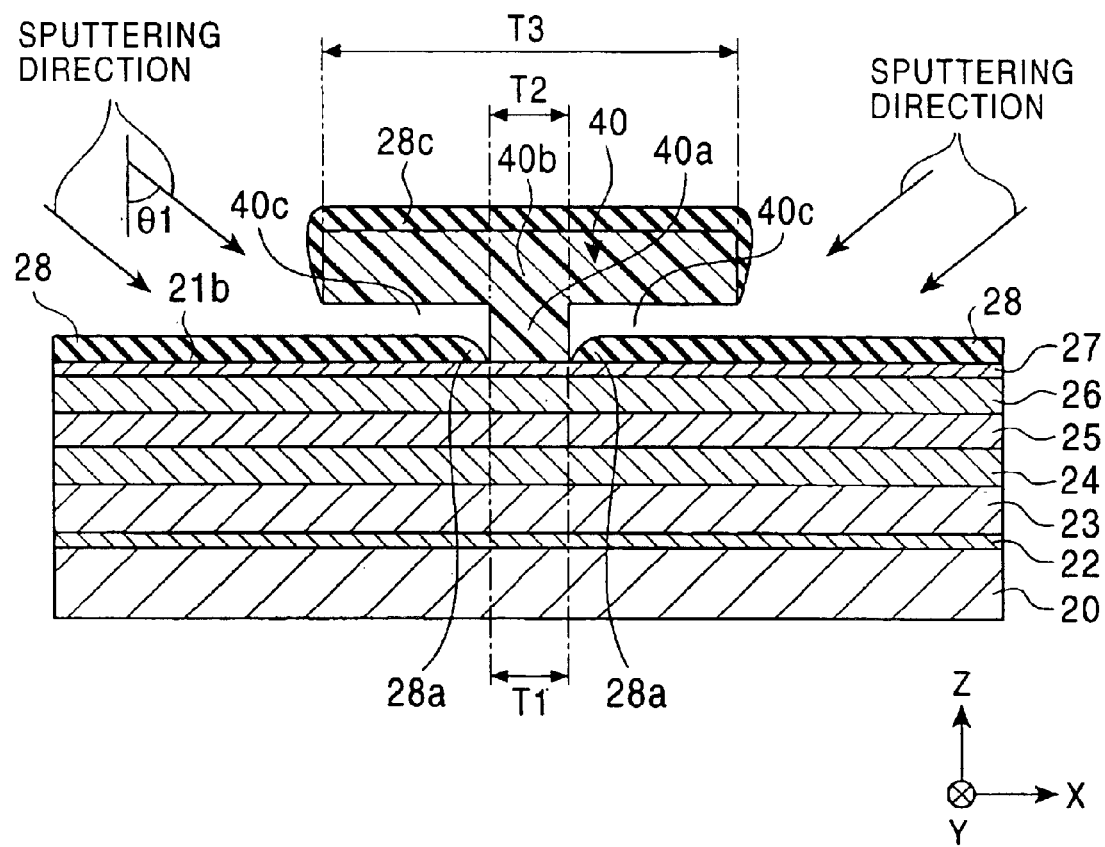
FIG. 3 is a partial cross-sectional view showing a step following the step shown in FIG. 2.

Next, in the step shown in FIG. 3, a resist layer 40 having a shape shown in FIG. 3 is formed on the upper surface 21b of the multilayer film 21 by exposure and development. In the figure, the resist layer 40 is provided approximately at the center of the upper surface 21b of the multilayer film 21. In this step, as exposure light, electron beams are preferably used since the width of the resist layer 40 can be decreased.

The resist layer 40 shown in FIG. 3 is composed of a lower portion 40a and an upper portion 40b. As shown in FIG. 3, the lower portion 40a of the resist layer 40 has a width dimension T2 in the track width direction (X direction in the figure) smaller than a width dimension T3 of the upper portion 40b of the resist layer 40 in the track width direction, and the resist layer 40 has the structure in which cutaway parts 40c are provided at two sides of the lower portion 40a in the track width direction.

The width dimension T2 of the lower portion 40a of the resist layer 40 is preferably in the range of from 30 to 50 nm. In addition, the width dimension T3 of the upper portion 40b of the resist layer 40 is formed in the range of from 0.1 to 0.2 $\mu$m.

After the resist layer 40 is formed, on parts of the upper surface 21b of the multilayer film 21 which are not overlapped with the resist layer 40 except for areas inside the cutaway parts 40c, the first gap layers 28 are formed. The first gap layers 28 are formed by a sputtering method, a deposition method, or the like.

In order to appropriately form the first gap layers 28 inside the cutaway parts 40c formed in the resist layer 40, when the first gap layers 28 are formed, the film formation is performed by sputtering at an angle $\theta 1$ which is inclined with respect to the direction (Z direction in the figure) perpendicular to the film surface. The sputtering angle $\theta 1$ is preferably in the range of from 40 to 80°. When the sputtering angle $\theta 1$ is set in the range described above, the first gap layers 28 can be appropriately formed inside the cutaway parts 40c of the resist layer 40.

When the first gap layers 28 are formed at an inclined angle described above using the resist layer 40 having the cutaway parts 40c provided at the sides of the lower portion 40a as shown in FIG. 3, since the first gap layers 28 are each unlikely to be formed at a place in the vicinity of each end surface of the lower portion 40a of the resist layer 40, the inside front portions 28a of the first gap layers 28 in the track width direction (X direction in the figure) have a warped shape as shown in FIG. 3.

In addition, the thickness of the first gap layer 28 is preferably in the range of from 20 to 100 Å. In this embodiment, the "thickness" indicates the maximum thickness. When the thickness of the first gap layer 28 is decreased smaller than that mentioned above, the effect as the current path-squeezing layer is decreased, and as a result, the current is likely to flow into the multilayer film 21 via the first gap layers 28. On the other hand, when being formed in the range described above, the first gap layers 28 sufficiently function as the current path-squeezing layer, and hence it is not necessary to have a thickness larger than the range described above. When the thickness of the first gap layer 28 is excessively increased, a problem may easily occur in that the resist layer 40 is not likely to be removed in a subsequent step. In addition, when the first gap layers 28 are formed by sputtering, the same material 28c as that for the first gap layers 28 adheres to the periphery of the upper portion 40b of the resist layer 40.

As shown in FIG. 3, when the first gap layers 28 are formed at the two sides of the lower portion 40a using the resist layer 40 having the cutaway parts 40c at the lower portion 40a, since the lower portion 40a of the resist layer 40 is present, the predetermined gap T1 is provided between the first gap layers 28. The predetermined gap T1 is approximately equivalent to the width dimension T2 of the lower portion 40a of the resist layer 40 in the track width direction. Accordingly, as a result, the predetermined gap T1 is to be formed in the range of from 30 to 50 nm.

Figure 4:
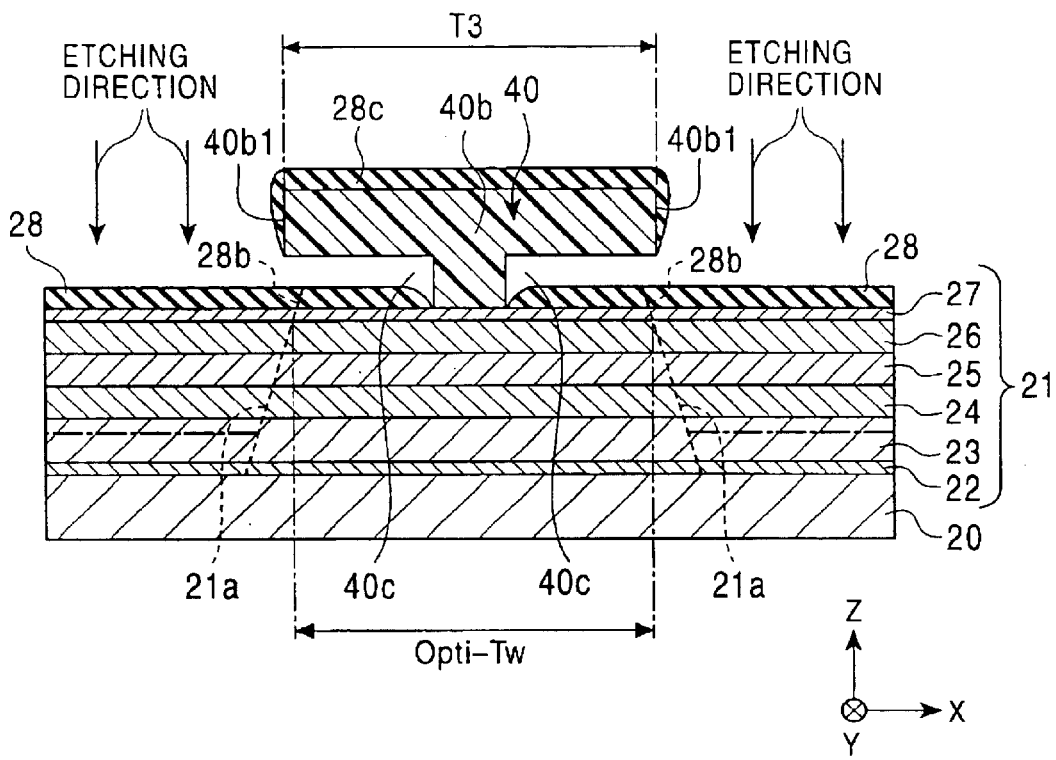
FIG. 4 is a partial cross-sectional view showing a step following the step shown in FIG. 3.

Next, in the step shown in FIG. 4, the first gap layers 28 and the multilayer film 21 located further from two end surfaces 40b1 in the track width direction (X direction in the figure) of the upper portion 40b of the resist layer 40 are removed by etching. The etching surfaces are shown by dotted lines.

As shown in FIG. 4, the etching surfaces are each formed as a continuous inclined surface composed of the end surface 28b of the first gap layer 28 and the end surface 21a of the multilayer film 21. The end surface 28b and the end surface 21a may form a warped surface instead of the inclined surface.

In addition, it is not necessary that the regions removed by the etching be the entire two end surfaces 21a of the multilayer film 21 indicated by the dotted lines, and for example, as shown by chain lines in FIG. 4, an etching depth may be controlled so that at least a part of the antiferromagnetic layer 23 extends further from the two end surfaces 21a in the track width direction.

The etching direction in the step shown in FIG. 4 is approximately perpendicular to the film surface of the multilayer film 21 as shown in FIG. 4. Accordingly, regions of the multilayer film 21 located further from the two end surfaces 40b1 of the resist layer 40 in the track width direction are primarily milled by the etching, and parts of the multilayer film 21 located under the cutaway parts 40c of the resist layer 40 are unlikely to be influenced by the etching.

Hence, the width dimension in the track width direction of the upper surface of the free magnetic layer 26 forming the multilayer film 21, which is obtained after the etching step described above, is approximately equivalent to the width dimension T3 of the upper potion 40b of the resist layer 40, and as a result, the width dimension of the upper surface of the free magnetic layer 26 becomes the optical track width Opti-Tw. Accordingly, the optical track width Opti-Tw is formed to be approximately equivalent to the width dimension of the upper portion 40b of the resist layer 40, that is, in the range of from 0.1 to 0.2 μm.

Figure 5:
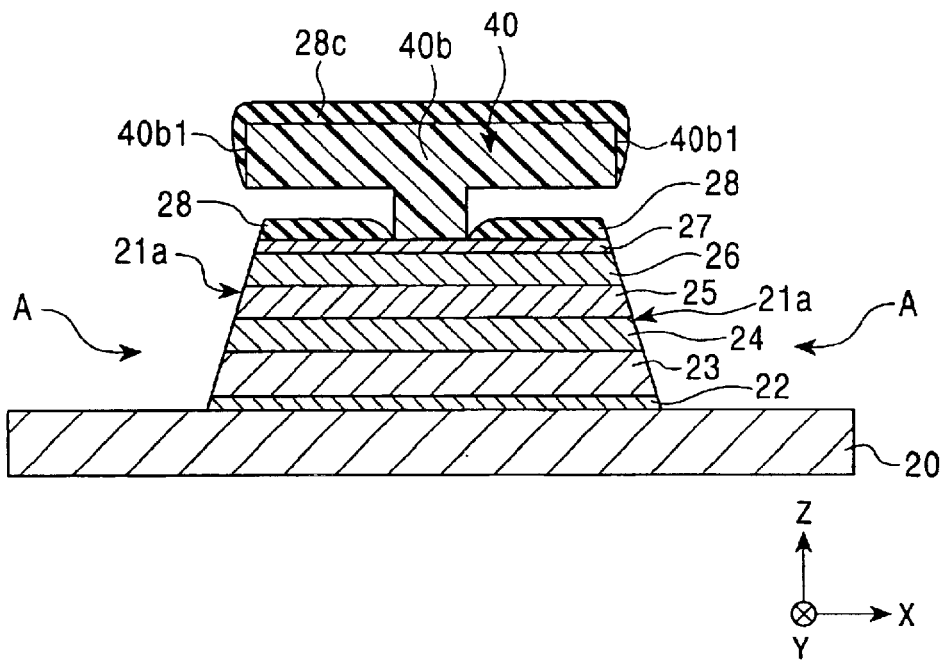
FIG. 5 is a partial cross-sectional view showing a step following the step shown in FIG. 4.

The structure of the magnetic sensor obtained after the etching step shown in FIG. 4 is shown in FIG. 5.

As shown in FIG. 5, space portions A are provided further from the two end surfaces 21a and 21a of the multilayer film 21 in the track width direction. In those space portions A, the upper surfaces of the lower shield layer 20 are exposed which extend in the track width direction further from the two end surfaces 21a of the multilayer film 21.

Figure 6:
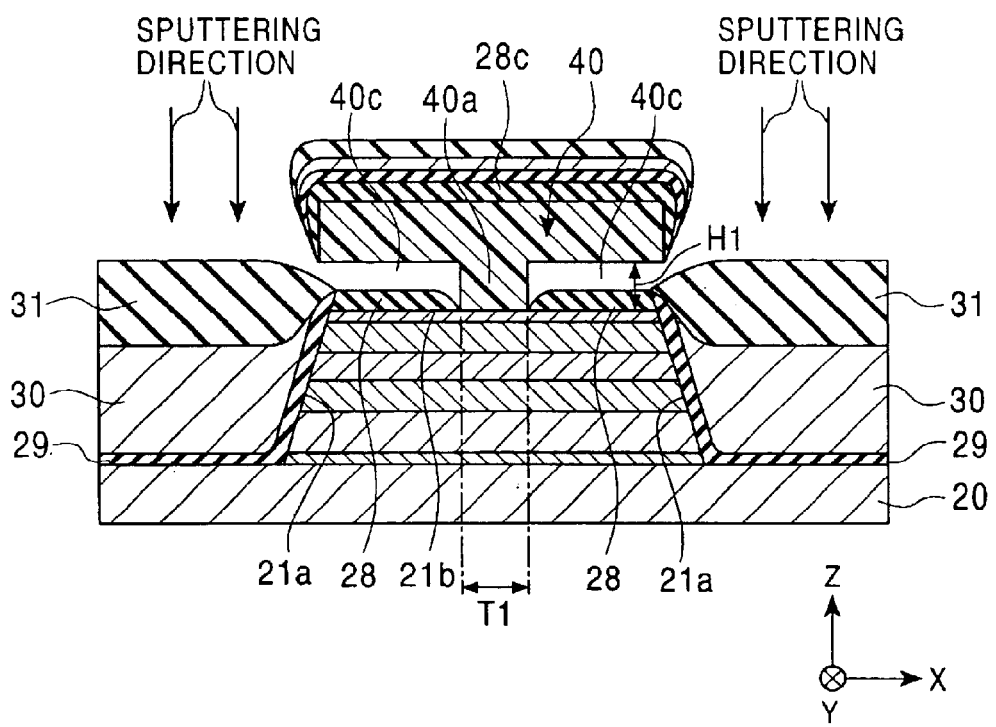
FIG. 6 is a partial cross-sectional view showing a step following the step shown in FIG. 5.

In the state shown in FIG. 5, the two end surfaces 21a of the multilayer film 21 are preferably side-etched or the like for cleaning. By this cleaning step, before a step shown in FIG. 6 is performed, contaminated layers such as oxide layers formed on the two end surfaces 21a of the multilayer film 21 can be removed, and in addition, the width dimension of the multilayer film 21 in the track width direction can be decreased. In particular, in the etching step shown in FIG. 4, since the step of milling the multilayer film 21 is performed after the first gap layers 28 are milled, a magnetic powder, which is generated when the first gap layers 28 are milled, adheres to the resist layer 40 in addition to the material layer 28c which already adhered to the two side surfaces 40b1 of the upper portion 40b of the resist layer 40. Hence, when the two end surfaces 21a of the multilayer film 21 are milled, the width dimension of the multilayer film 21 in the track width direction tends to be formed larger than the width dimension T3 between the two end surfaces 40b1 of the resist layer 40, and as a result, the optical track width Opti-Tw of the multilayer film 21 is likely to be increased. Accordingly, it is preferable that the optical track width Opti-Tw be further decreased by performing the side etching described above.

Next, in the step shown in FIG. 6, in the space portions A, the second gap layers 29 are formed by a sputtering method or a deposition method. The second gap layers 29 are formed over the two end surfaces 21a of the multilayer film 21 to the upper surfaces of the lower shield layer 20 extending from the two end surfaces 21a of the multilayer film 21 in the track width direction. The sputtering angle when the second gap layers 29 are formed is approximately perpendicular to the film surface of the multilayer film 21.

Hence, the second gap layers 29 are unlikely to be formed inside the cutaway parts 40c provided at the two sides of the lower portion 40a of the resist layer 40. In addition, the second gap layers 29 are likely to be formed to have a thickness larger on the lower shield layer 20 than that on the two end surfaces 21a of the multilayer film 21.

The sputtering angle when the second gap layers 29 are formed is preferably in the range of from 5 to 60° with respect to the direction perpendicular to the film surface of the multilayer film 21.

Next, on the second gap layers 29, the hard bias layers 30 of a hard magnetic material are formed, and on the hard bias layers 30, the third gap layers 31 are further formed. The hard bias layers 30 and the third gap layers 31 are formed by sputtering at a sputtering angle approximately perpendicular to the film surface of the multilayer film 21 as is the case of the second gap layers 29.

Hence, both the hard bias layers 30 and the third gap layers 31 are unlikely to be formed inside the cutaway parts 40c formed in the resist layer 40.

Even when the second gap layers 29 and the third gap layers 31 are formed inside the cutaway parts 40c of the resist layer 40 so as to overlap the first gap layers 28 provided on the upper surface 21b of the multilayer film 21, the effect obtained by the formation of the first gap layers 28 (the effect of appropriately squeezing a current path) is not decreased, and on the other hand, the effect described above can be further enhanced.

However, in the step shown in FIG. 6, in order to carry out the manufacturing process easier, the second gap layers 29 and the third gap layers 31 are preferably not to be formed inside the cutaway parts 40c of the resist layer 40. The reason for this is as follows. When the second gap layers 29 and the third gap layers 31 are formed inside the cutaway parts 40c of the resist layer 40, since the height of the cutaway parts 40c is at most in the range of from 30 to 60 nm, after the first gap layers 28, the second gap layers 29, and the third gap layers 31 are formed, spaces remaining in the cutaway parts 40c are hardly present, or even when being present, the spaces become very limited. Hence, as a result, it becomes very difficult to dissolve and remove the resist layer 40 by injecting a solvent into these spaces.

In addition, as described above, since the first gap layers 28 can be formed to have a sufficient dimension to ensure the insulation between the multilayer film 21 and the upper shield layer 32 formed in the following step, which face each other with the first gap layers 28 provided therebetween, when the second gap layers 29 and the third gap layers 31 are formed on the first gap layers 28, the current path-squeezing effect cannot be significantly improved as compared to that obtained when the first gap layers 28 are only formed as the single-layer structure, and in addition, any effect other than the current path-squeezing effect cannot be further expected. Hence, it is not so important from technical point of view to provide the second gap layers 29 and/or the third gap layers 31 on the first gap layers 28. Accordingly, in order to realize smooth manufacturing of a magnetic sensor, the second gap layers 29 and the third gap layers 31 are preferably formed only in the spaces portions A shown in FIG. 5.

After the step shown in FIG. 6, the resist layer 40 is removed, and the upper shield layer 32 is formed over the third gap layers 31 to the first gap layers 28 and also over the multilayer film 21 exposed through the gap T1 provided between the first gap layers 28. By this formation, the magnetic sensor shown in FIG. 1 is completed.

The manufacturing method shown in FIGS. 2 to 6 comprises, as first shown in FIGS. 2 and 3, forming the multilayer film 21 over the entire surface of the lower shield layer 20, then providing the resist layer 40, having the lower portion 40a provided with the cutaway parts 40c at the two sides thereof, on the multilayer film 21, forming the first gap layers 28 on parts of the multilayer film 21 which are not overlapped with the resist layer 40 except for areas inside the cutaway parts 40c, and then as shown in FIG. 4, milling the two end surfaces 21a and 28b of the multilayer film 21 and the first gap layers 28.

Figure 15:
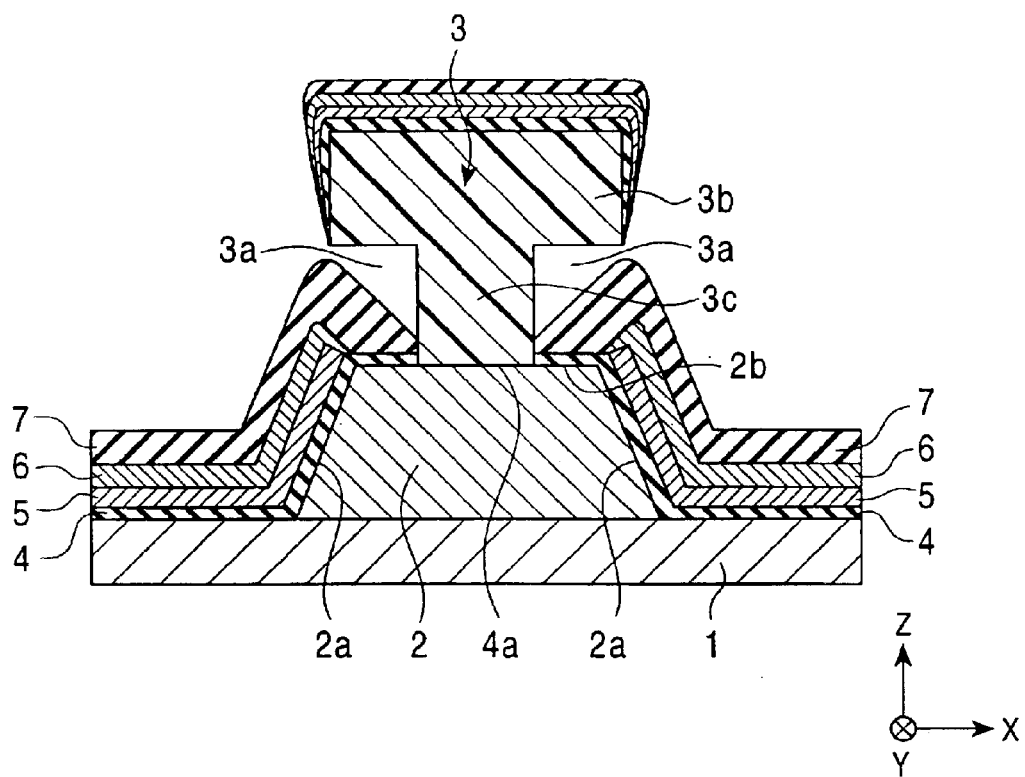
FIG. 15 is a partial cross-sectional view of a magnetic sensor in a related manufacturing process, when it is viewed from a face facing a recording medium.

That is, according to the related technique shown in FIG. 15, after the two end surfaces 2a of the multilayer film 2 is milled to form a predetermined shape, the lower insulating layers 4 are formed on areas including the cutaway parts 3a provided in the resist layer 3. However, according to the method described above, since a magnetic powder generated in milling of the multilayer film 21 adheres to the periphery of the resist layer 3, it is difficult to form the lower insulating layers 4 inside the cutaway parts 3a of the resist layer 3 so as to have a predetermined width and a predetermined thickness. As a result, a problem may arise in that the current path-squeezing effect is decreased.

In contrast, according to the present invention, since the two end surfaces 28b and 21a of the first gap layers 28 and the multilayer film 21 are milled after the first gap layers 28 provided with the predetermined gap T1 therebetween are formed, a magnetic powder generated in milling will not have any adverse influence when the first gap layers 28 are formed, and hence, the first gap layers 28 having a predetermined width and a predetermined thickness can be easily formed inside the cutaway parts 40c of the resist layer 40.

Consequently, according to the present invention, the predetermined gap T1 provided between the first gap layers 28 can be formed as a very small space having a distance of 30 to 50 nm, and in addition, the insulation between the multilayer film 21 and the upper shield layer 32, which are provided on the bottom and the top sides of the first gap layers 28, can be sufficiently ensured. Hence, compared to the case in the past, by using an easy method, a magnetic sensor can be manufactured having the structure in which the current path-squeezing effect is superior, the magnetic track width Mag-Tw is small, and the change in resistance (ΔR) and the reproduction output can be increased.

In addition, according to the manufacturing method shown in FIGS. 2 to 6, by using only one resist layer 40 formed in the step shown in FIG. 3, the formation of the first gap layers 28, the milling of the two end surfaces 21a and 28a of the multilayer film 21 and the first gap layers 28, and the formation of the second gap layers 29, the hard bias layers 30, and the third gap layers 31 can all be carried out.

As described above, by the manufacturing method using a self-alignment technique in which the steps described above are all carried out by using only one resist layer 40, for example, the alignment accuracy of the position of the gap T1 formed between the first gap layers 28 with respect to the upper surface 21b of the multilayer film 21 can be improved by a simple method.

Figure 16:
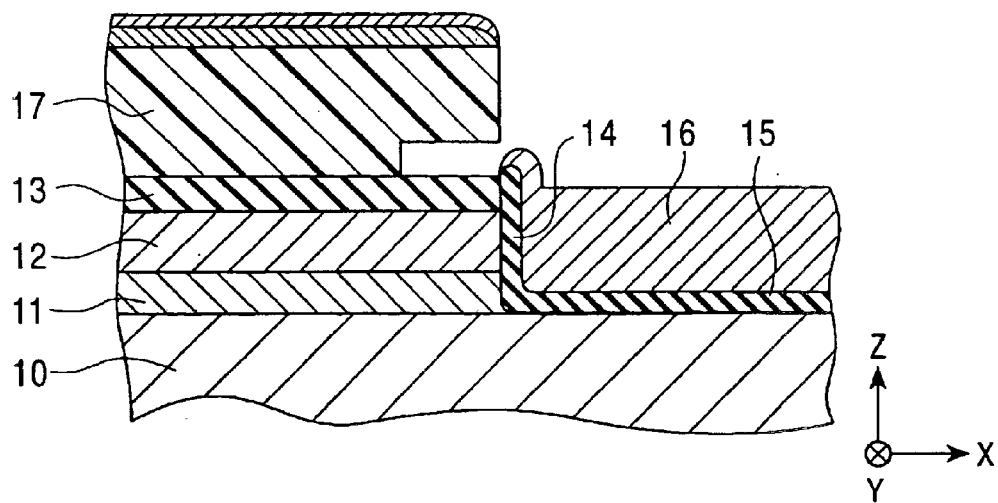
FIG. 16 is a partial cross-sectional view of a magnetic sensor in a related manufacturing process different from that shown in FIG. 15, when it is viewed from a face facing a recording medium.
Figure 17:
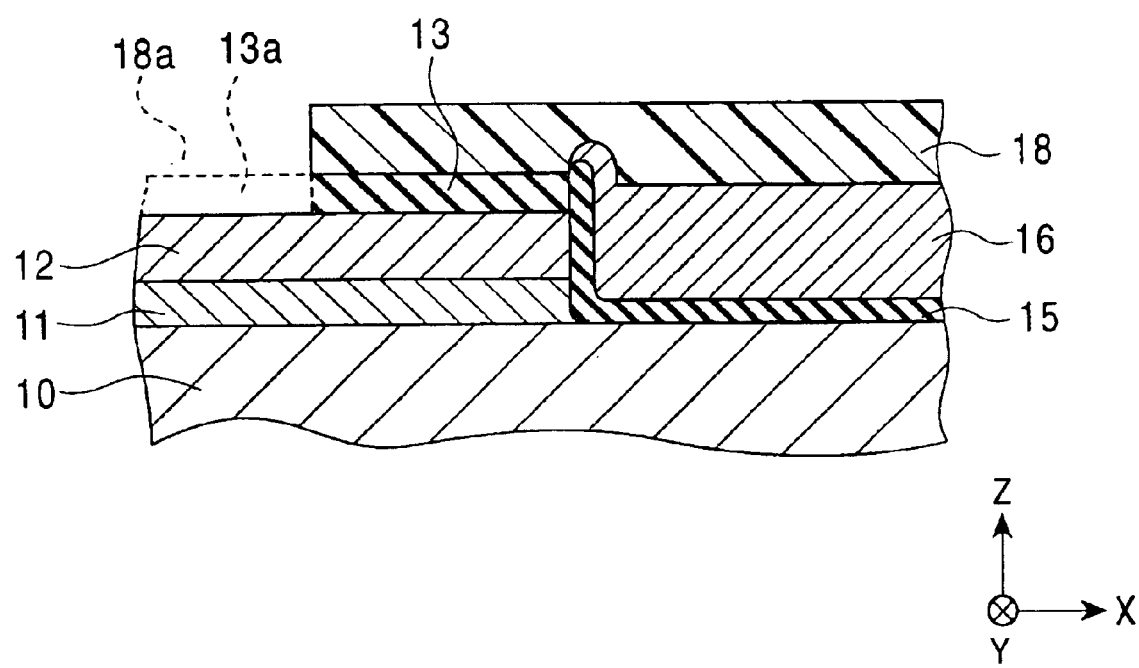
FIG. 17 is a partial cross-sectional view showing a step following the step shown in FIG. 16.

In addition, according to the present invention, by using the resist layer 40, when the first gap layers 28 are formed, the predetermined gap T1 is simultaneously provided between the first gap layers 28. Hence, unlike the related technique shown in FIG. 16 and 17, since it is not necessary that a part of the multilayer film be exposed by forming an opening in the first gap layer 28 in a subsequent step, the manufacturing method of this embodiment is easy as compared to that of the related technique shown in FIGS. 16 and 17, and in addition, a problem in that the upper surface 21b of the multilayer film 21 is damaged by etching or the like will not arise at all.

As has thus been described, according to the manufacturing method shown in FIGS. 2 to 6, the gap T1 provided between the first gap layers 28 can be decreased, the current path-squeezing effect can be improved, and the magnetic track width Mag-Tw can be decreased; however, when current flowing through the multilayer film 21 flows and spreads wider than the gap T1, the magnetic track width Mag-Tw is increased in accordance with the spread. Hence, the maximum width of the magnetic track width Mag-Tw becomes equivalent to the width dimension of the optical track width Opti-Tw.

Accordingly, the optical track width Opti-Tw is preferably formed as small as possible, since the spread of the current path in the multilayer film 21 can be suppressed, and the narrowing of the magnetic track width can be realized.

A second method for manufacturing a magnetic sensor, according to the present invention, shown in FIGS. 7 to 10, provides a method in which the optical track width Opti-Tw is formed smaller than that obtained by the manufacturing method of the magnetic sensor shown in FIGS. 2 to 6.

A flow chart shown in FIGS. 7 to 10 includes partial cross-sectional views showing the structure of a magnetic sensor in a manufacturing step when it is viewed from a face facing a recording medium.

Figure 7:
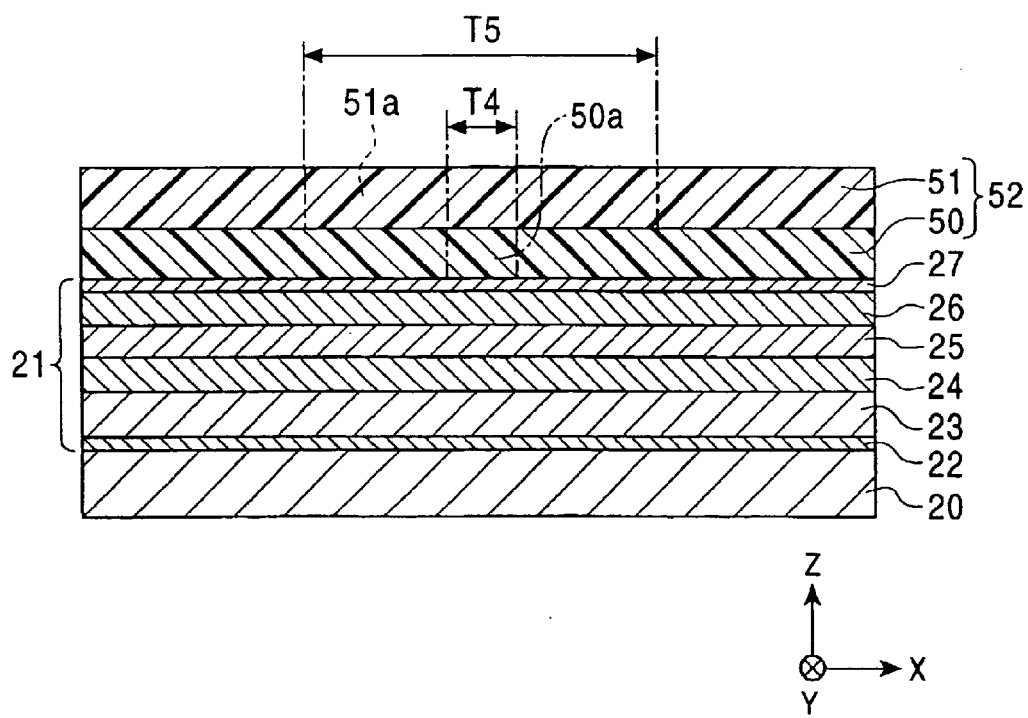
FIG. 7 is a partial cross-sectional view showing a second method for manufacturing the magnetic sensor shown in FIG. 1.

In the step shown in FIG. 7, on the lower shield layer 20 is formed the seed layer 22, the antiferromagnetic layer 23, the fixed magnetic layer 24, the non-magnetic material layer 25, the free magnetic layer 26, and the protective layer 27 in that order from the bottom. The layers formed of from the seed layer 22 through the protective layer 27 are collectively called the multilayer film 21.

As shown in FIG. 7, onto the protective layer 27, a lower resist layer 50 and an upper resist layer 51 are formed by application. The lower resist layer 50 and the upper resist layer 51 are collectively called a first resist layer 52.

In this embodiment, the lower resist layer 50 has a development speed faster than that of the upper resist layer 51. Accordingly, as shown in FIG. 7, by exposure and development, a small region of the lower resist layer 50 indicated by reference numeral 50a only remains between chains lines, and on the other hand, a wide region of the upper resist layer 51 indicated by reference numeral 51a remains between dotted lines.

The width dimension of the lower resist layer 50a in the track width direction (X direction in the figure) remaining after the exposure and development is represented by T4, and the width dimension of the upper resist layer 51a in the track width direction remaining after the exposure and development is represented by T5. The width dimension T4 of the lower resist layer 50a is preferably formed in the range of from 30 to 50 nm. In this case, the width dimension T5 of the upper resist layer 51a is in the range of from 0.1 to 0.2 μm.

The resist layer 40 used in the step shown in FIG. 3 may have the structure composed of the two resist layers 50 and 51 as is the case shown in FIG. 7.

Figure 8:
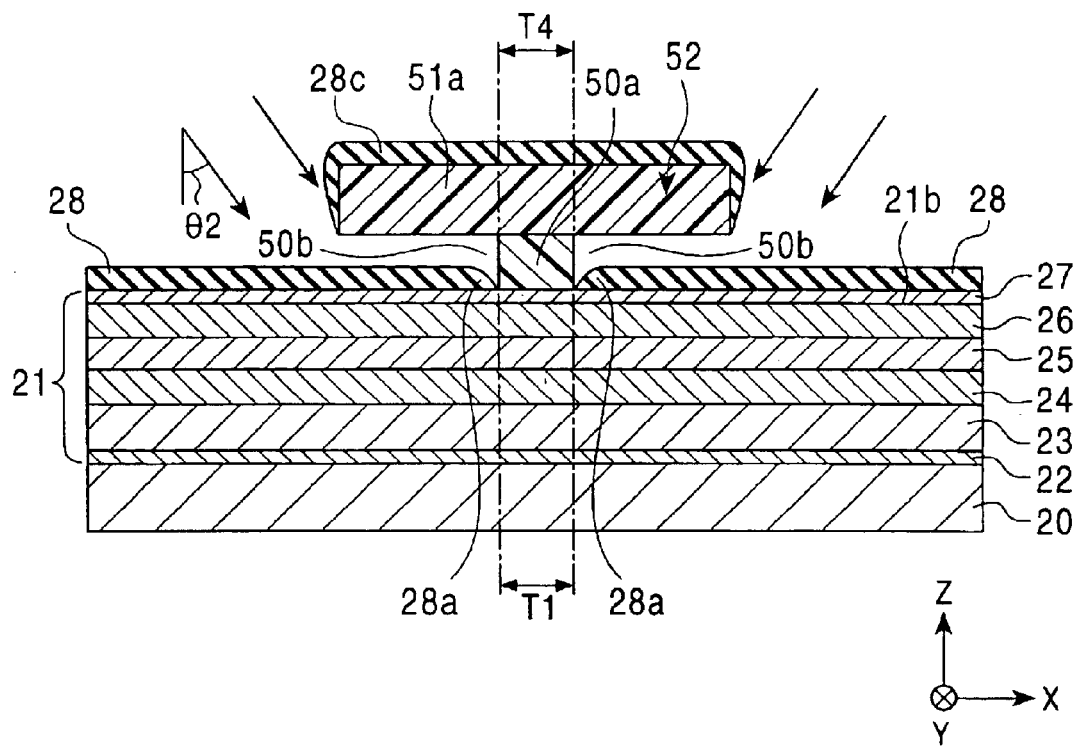
FIG. 8 is a partial cross-sectional view showing a step following the step shown in FIG. 7.

As shown in FIG. 8, since the first resist layer 52 remaining on the multilayer film 21 has a laminate structure composed of a lower resist layer 50a and an upper resist layer 51a, and the width dimension T4 of the lower resist layer 50a in the track width direction (X direction in the figure) is smaller than the width dimension T5 of the upper resist layer 51a, the first resist layer 52 has the structure in which cutaway parts 50b are formed on two sides of the lower resist layer 50a in the track width direction.

Next, in the step shown in FIG. 8; the first gap layers 28 are formed by a sputtering method or a deposition method on parts of the upper surface 21b of the multilayer film 21 which are not overlapped with the first resist layer 52 except for areas inside the cutaway parts 50b.

In order to appropriately form the first gap layers 28 inside the cutaway parts 50b formed in the first resist layer 52, sputtering is performed at a sputtering angle θ2 inclined with respect to the direction (Z direction in the figure) perpendicular to the film surface when the first gap layers 28 are formed. The sputtering angle θ2 is preferably in the range of from 40 to 80°. When the sputtering angle θ2 is set in the range described above, the first gap layers 28 can be appropriately formed inside the cutaway parts 50b of the first resist layer 52.

When the first resist layer 52 provided with the cutaway parts 50b at the lower portion as shown in FIG. 8 are used, and the first gap layers 28 are formed by sputtering along an inclined direction, the first gap layers 28 are unlikely to be formed in the vicinity of two end surfaces of the lower resist layer 50a forming the first resist layer 52. Accordingly, the inside front portions 28a of the first gap layers 28 in the track width direction (X direction in the figure) have a warped shape as shown in FIG. 3.

In addition, the thickness of the first gap layers 28 is preferably in the range of from 20 to 100 Å. In this embodiment, the "thickness" indicates the maximum thickness. When the thickness of the first gap layer 28 is decreased smaller than the range mentioned above, the effect as the current path-squeezing layer is decreased, and as a result, the current is likely to flow into the multilayer film 21 via the first gap layers 28. On the other hand, when being formed in the range described above, since the first gap layers 28 sufficiently function as the current path-squeezing layer, it is not necessary to increase the thickness larger than the range described above. When the thickness is excessively increased, a problem may easily occur in that the first resist layer 52 is unlikely to be removed in a subsequent step. In addition, when the first gap layers 28 are formed by sputtering, the same material 28c as that for the first gap layers 28 adheres to the periphery of the upper resist layer 51a of the first resist layer 52.

As shown in FIG. 8, by using the first resist layer 52 having the cutaway parts 50b at the lower portion, when the first gap layers 28 are formed at the two sides of the lower resist layer 50a of the first resist layer 52, due to the presence of the lower resist layer 50a, the predetermined gap T1 is provided between the first gap layers 28. The predetermined gap T1 is approximately equivalent to the width dimension T3 of the lower resist layer 50a of the first resist layer 52 in the track width direction. Accordingly, as a result, the predetermined gap T1 is to be formed in the range of from 30 to 50 nm.

Next, in the step shown in FIG. 9, the first resist layer 52 is removed, and a new resist layer (hereinafter referred to as a "second resist layer") 53 is formed by application over the first gap layers 28 to the multilayer film 21 exposed through the gap T1 provided between the first gap layers 28.

The second resist layer 53 has a single-layer structure unlike the structure of the first resist layer 52. The second resist layer 53 is formed, for example, of the same material as that for the upper resist layer 51. The second resist layer 53 is processed by exposure and development using electron beams to form the structure as shown in FIG. 9.

A width dimension T6 of the second resist layer 53 in the track width direction (X direction in the figure) can be made smaller than the width dimension T5 of the upper resist layer 51a forming the first resist layer 52 in the steps shown in FIGS. 7 and 8.

Figure 9:
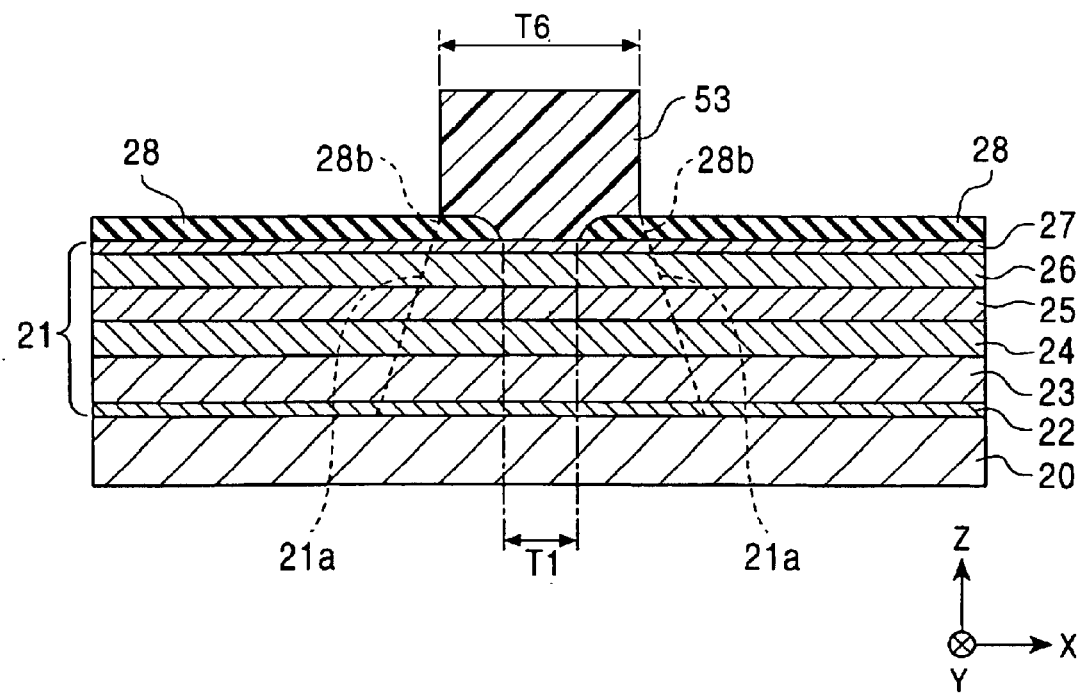
FIG. 9 is a partial cross-sectional view showing a step following the step shown in FIG. 8.

In the step shown in FIG. 9, unlike the step shown in FIG. 7, the lower resist layer 50 having a high development speed is not provided, and hence there is not limitation as is the case in which the width dimension T4 of the lower resist layer 50a is set to a predetermined width dimension. That is, in FIG. 7, the upper resist layer 51 is provided so that the width dimension T4 of the lower resist layer 50a is set to a predetermined width dimension, and that the structure is formed having the cutaway parts 50b at the lower portion, and in the step shown in FIG. 7, the width dimension T4 of the lower resist layer 50a is most preferentially controlled. Accordingly, the width dimension T5 of the upper resist layer 51a may have a length of 0.1 to 0.2 μm as described above. In contrast, in the step shown in FIG. 9, since the limitation described above is not present, for example, the width dimension T6 of the second resist layer 53 formed of the same material as that for the upper resist layer 51 can be decreased as small as possible, and the width dimension T6 can be decreased to 0.05 to 0.1 μm.

The second resist layer 53 shown in FIG. 9 is formed so that the center in the width direction thereof is approximately aligned to the center in the width direction of the gap T1 provided between the first gap layers 28.

In the step shown in FIG. 9, after the second resist layer 53 is formed, parts of the two end surfaces 21a of the multilayer film 21 and the two end surfaces 28b of the first gap layers 28, which are not overlapped with the second resist layer 53, are removed by etching. The etching direction is approximately perpendicular to the film surface of the multilayer film 21.

Figure 10:
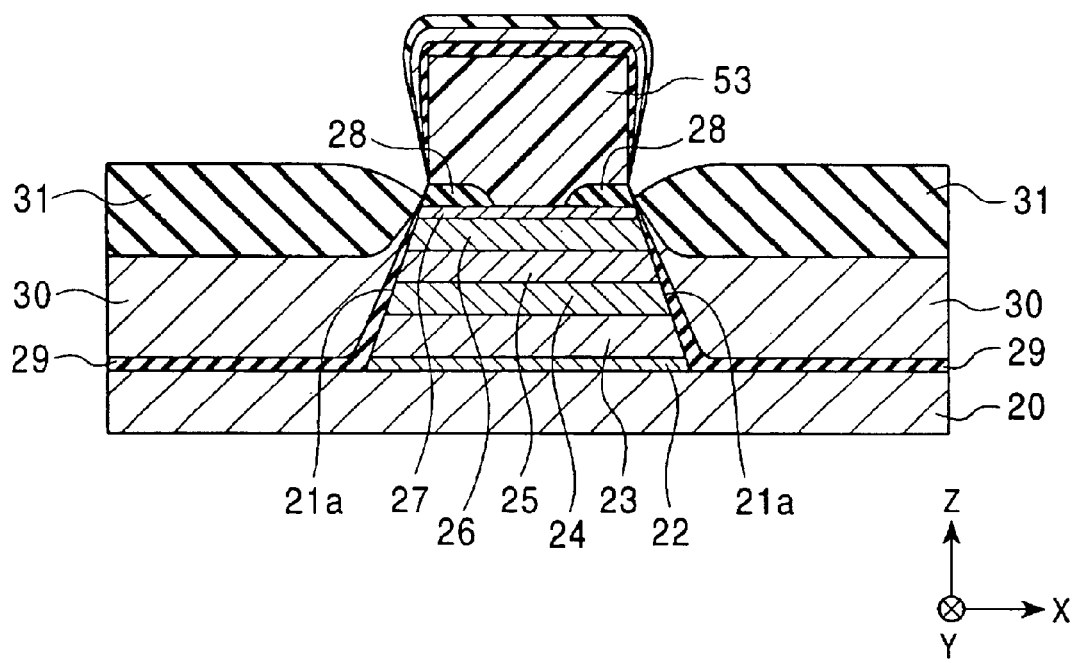
FIG. 10 is a partial cross-sectional view showing a step following the step shown in FIG. 9.

Next, in the step shown in FIG. 10, the second gap layers 29 are formed over the two end surfaces 21a of the multi-layer film 21 and the lower shield layer 20 extending further from the two end surfaces 21a in the track width direction, the hard bias layers 30 are formed on the second gap layers 29, and in addition, the third gap layers 31 are further formed on the hard bias layers 30. Subsequently, the second resist layer 53 is removed, and the upper shield layer 32 is formed over the third gap layers 31, the first gap layers 28, and the multilayer film 21 exposed through the gap T1 provided between the first gap layers 28. When the second gap layers 29, the hard bias layers 30, and the third gap layers 31 are formed, a material layer composed of the same materials as those of the above mentioned layers may adhere to the periphery of the second resist layer 53, and may be brought into contact with the third gap layers 31 or the like so as to entirely cover the periphery of the second resist layer 53 in some cases. In the case described above, since the second resist layer 53 cannot be dissolved and removed by an alkali solution or the like, an opening portion is formed in the material layer adhering to the periphery of the second resist layer 53 by reactive ion etching or the like, and an alkali solution or the like is supplied through this opening portion, so that the second resist layer 53 is dissolved and removed. In this case, since unnecessary flashes may remain on the third gap layers 31 or the first gap layers 28, these flashes are removed by etching or the like.

The manufacturing method including the steps shown in FIGS. 7 to 10 is characterized in that the first resist layer 52 for forming the first gap layers 28 and the second resist layer 53 for defining the multilayer film 21 into a predetermined shape are different from each other.

The first resist layer 52 is formed of two types of resist layers, having different development speeds, laminated to each other; the lower resist layer 50 is formed of a material having a development speed faster than that of the upper resist layer 51; and the width dimension T4 of the lower resist layer 50a formed by exposure and development is decreased to approximately 30 to 50 nm. Accordingly, the gap T1 provided between the first gap layers 28 can be decreased to approximately 30 to 50 nm.

On the other hand, the second resist layer 53 is formed so that the width dimension T6 thereof is smaller than the width dimension T5 of the upper resist layer 51a forming the first resist layer 52, and the width dimension T6 is formed in the range of from approximately 0.05 to 0.1 µm.

Hence, when parts of the two sides of the first gap layers 28 and the multilayer film 21, which are not overlapped with the second resist layer 53, are milled, the width dimension in the track width direction of the upper surface of the free magnetic layer 26 which forms the multilayer film 21 under the second resist layer 53 becomes approximately equivalent to the width dimension T6 described above. Hence, the optical track width Opti-Tw controlled by the width dimension of the upper surface of the free magnetic layer 26 can be decreased as compared to that obtained in the steps shown in FIGS. 2 to 6.

According to the magnetic sensor formed through the steps shown in FIGS. 7 to 10, since the optical track width Opti-Tw itself can be decreased, even when current flowing through the multilayer film 21 flows and spreads wider than the gap T1 formed between the first gap layers 28, the spread mentioned above cannot be larger than the optical track width Opti-Tw, and hence, compared to the magnetic sensor formed through the steps shown in FIGS. 2 to 6, the narrowing of the magnetic track width Mgr-Tw can be improved.

In addition, the second resist layer 53 formed in the step shown in FIG. 9 is not provided with cutaway parts at the lower side unlike the first resist layer 52 described in the steps shown in FIGS. 7 and 8; however, cutaway parts may be formed in the two sides of a lower portion of the second resist layer 53. In the case described above, a resist which forms cutaway parts in the two sides of the lower portion thereof in exposure and development is selected and is used as the second resist layer 53. In addition, in the case in which the cutaway parts are formed in the two sides of the lower portion of the second resist layer 53, when the second resist layer 53 is removed, an alkali solution or the like can be supplied through these cutaway parts to dissolve the second resist layer 53, thereby simplifying a removing step of removing the second resist layer 53.

The method for manufacturing a magnetic sensor, according to the present invention, has been described with reference to FIGS. 2 to 10, and a mask layer used for forming the first gap layers 28 and a mask layer used when the two end surfaces 21a of the multilayer film 21 are milled may be formed of a material other than a resist.

In addition, the multilayer film 21 may have a different film structure from that containing the seed layer 22, the antiferromagnetic layer 23, the fixed magnetic layer 24, the non-magnetic material layer 25, the free magnetic layer 26, and the protective layer 27, and as long as containing a layer exhibiting a magnetoresistance effect, the film structure is not limited to that described above.

In addition, no hard bias layers 30 may be provided at the two sides of the multilayer film 21 in the track width direction, and in the case described above, gap layers made of an insulating material are formed at the two sides of the multilayer film 21 in the track width direction for ensuring the insulation between the lower shield layer 20 and the upper shield layer 32.

Figure 11:
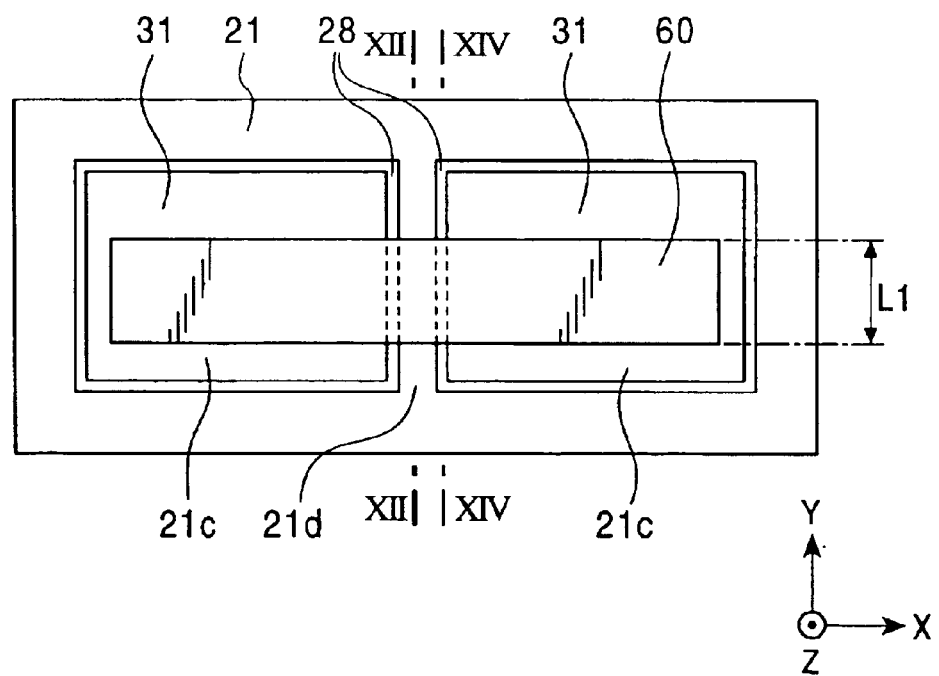
FIG. 11 is a partial plan view of a magnetic sensor in a manufacturing process for illustrating a method for forming a back gap layer.

Steps shown in FIGS. 11 to 14 relate to a method for forming a back gap layer provided at the rear side of the magnetic sensor shown in FIG. 1 in the height direction (Z direction in the figure). FIG. 11 is a plan view of the magnetic sensor when the step shown in FIG. 6 is completed, or is a plan view of the magnetic sensor when the step shown in FIG. 10 is completed. The plan view shown in FIG. 11 is a plan view showing the state in which the resist layer 40 in the step shown in FIG. 6 or the resist layer 53 in the step shown in FIG. 9 is removed.

As shown in FIG. 11, the multilayer film 21 is provided with a pair of window portions 21c in the track width direction; in each of the window portions 21c, the second gap layer 29, the hard bias layer 30, and the third gap layer 31 are formed in that order from the bottom; and the upper surface of the third gap layer 31 is exposed through the window portion 21c.

As shown in FIG. 11, the upper surfaces of the first gap layers 28, each of which have a predetermined width and are provided on the multilayer film 21, are exposed along the peripheries of the window portions 21c.

A rectangular structure 21d of the multilayer film 21 located between the window portions 21c is a region for defining the optical track width Opti-Tw, and a part of the multilayer film 21 in this region is allowed to finally remain as a product.

As shown in FIG. 11, a resist layer 60 having a predetermined length L1 in the height direction (the length dimension L1 in this embodiment indicates a length dimension of the upper surface of the resist layer 60 in the height direction) is provided across the two window portions 21c and the rectangular structure 21d in the track width direction (X direction in the figure). The predetermined length L1 is, for example, in the range of from 0.5 to 5 µm.

Figure 12:
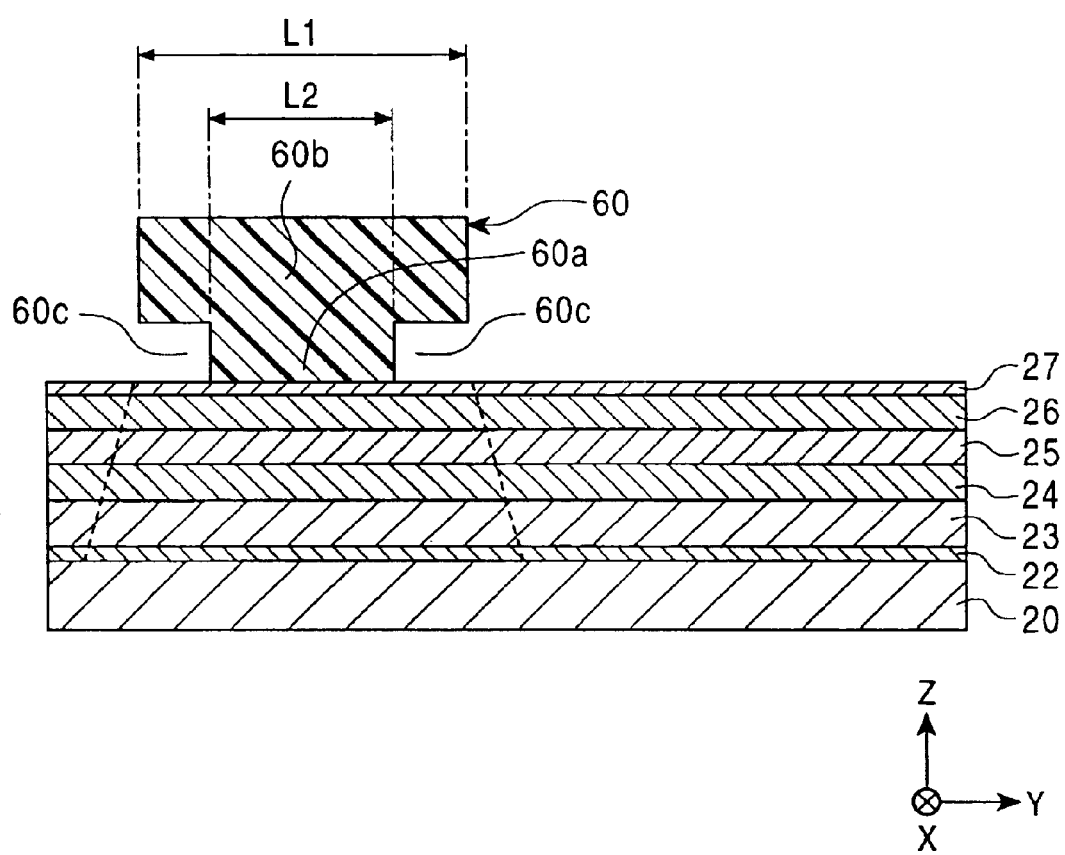
FIG. 12 is a partial, vertical cross-sectional view of the magnetic sensor taken along the line XII—XII shown in FIG. 11.

When the magnetic sensor shown in FIG. 11 is taken along a dotted line XII—XII in the direction parallel to the Y-Z plane in the figure, the state of the magnetic sensor is as shown in FIG. 12 in which the resist layer 60 having a predetermined shape is provided on the multilayer film 21.

In a lower portion 60a of the resist layer 60, cutaway parts 60c are formed at the two sides in the height direction so that a length dimension L2 of the lower portion 60a in the height direction is smaller than the length dimension L1 of an upper portion 60b in the height direction.

In the step shown in FIG. 12, parts of the multilayer film 21 and the laminate structures formed in the window portions 21c, which are not overlapped with the resist layer 60, are entirely removed by etching (parts of the multilayer film 21 located further from dotted lines in the height direction).

Figure 13:
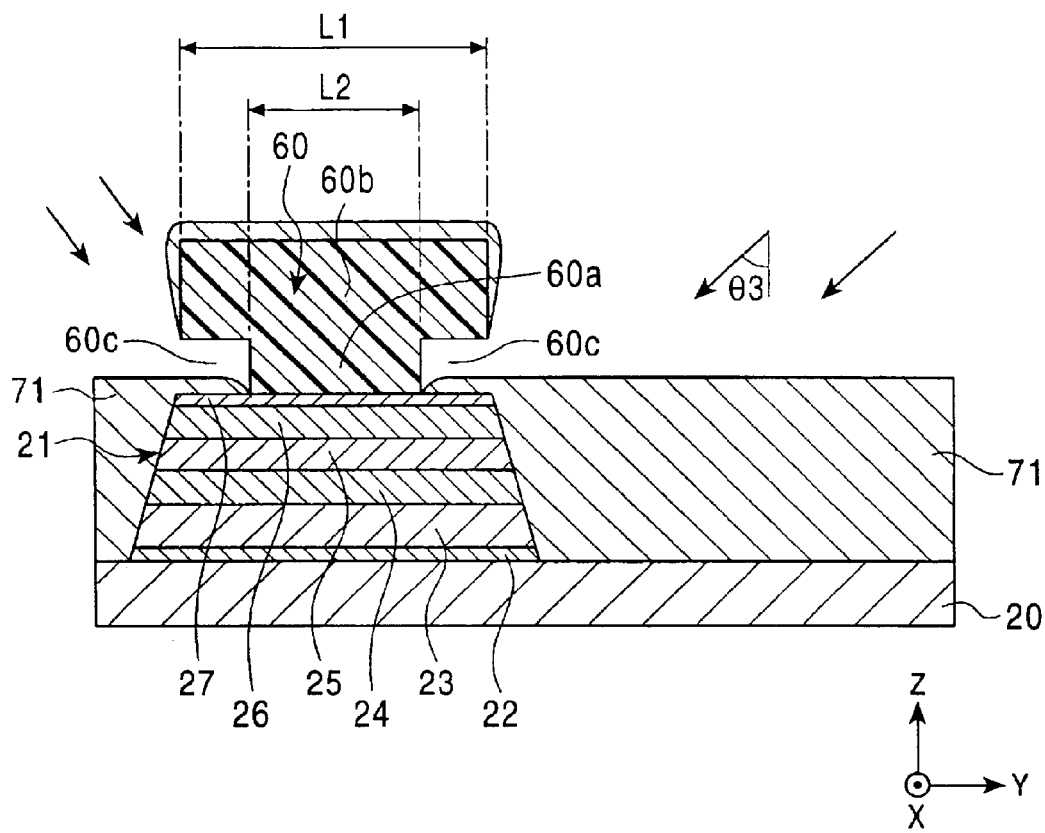
FIG. 13 is a partial, vertical cross-sectional view showing a step following the step shown in FIG. 12.

Next, in the step shown in FIG. 13, on the lower shield layer 20 exposed along the periphery of the resist layer 60, a back gap layer 71 is formed using a sputtering method or a deposition method.

In this case, when the back gap layer 71 is formed by sputtering at a sputtering angle θ3 inclined from the direction perpendicular to the film surface of the multilayer film 21, the back gap layer 71 can be formed even in the cutaway parts 60c provided in the two sides of the lower portion 60a of the resist layer 60. That is, the back gap layer 71 is formed so as to extend on part of the upper surface 21b of the multilayer film 21.

Figure 14:
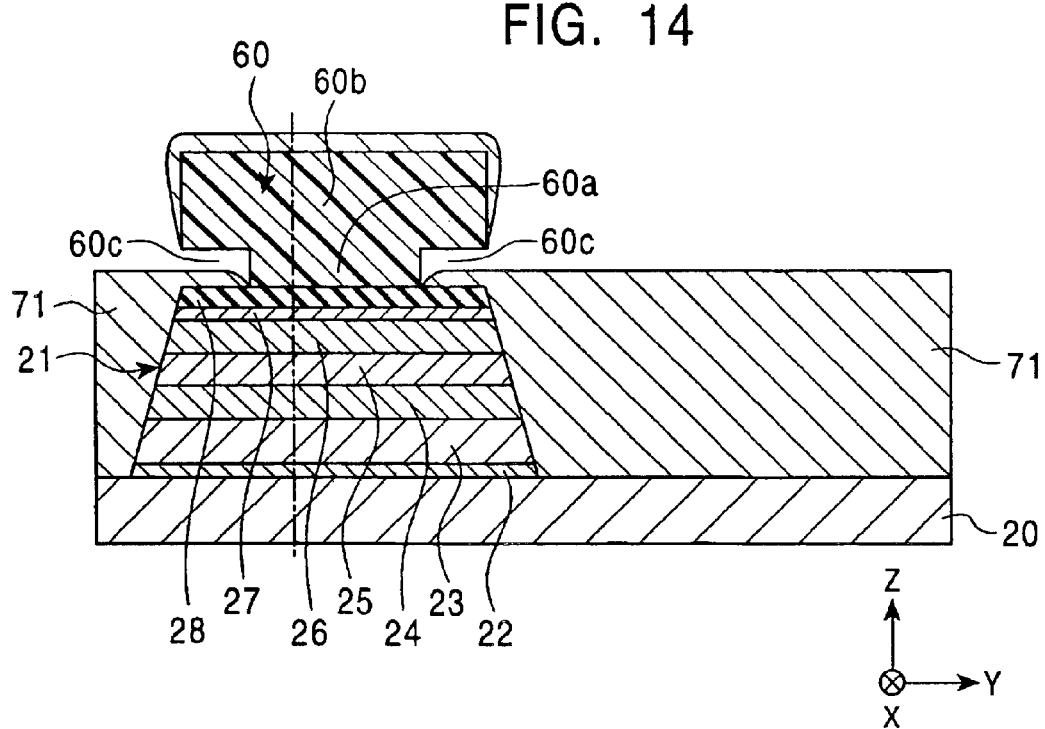
FIG. 14 is a partial, vertical cross-sectional view of the magnetic sensor which is taken along the line XIV—XIV shown in FIG. 11 and is further provided with a back gap layer.

FIG. 14 shows the state of the magnetic sensor taken along the chain line XIV—XIV in the direction parallel to the Y-Z plane in the figure shown in FIG. 11 and is a partial cross-sectional view of the magnetic sensor which is processed by the step in FIG. 12 and is further provided with the back gap layer 71. In the magnetic sensor shown in FIG. 14, a part of the first gap layer 28 is provided on the multilayer film 21.

When the parts of the multilayer film 21 and the laminate structures in the window portions 21c, which are not overlapped with the resist layer 60, are removed by etching as described in the step shown in FIG. 12, and the formation of the back gap layer 71 in the step shown in FIG. 13 is performed, the back gap layer 71 is formed on the first gap layers 28 to extend into the cutaway parts 60c of the resist layer 60. Hence, the surface of the back gap layer 71 extending on the multilayer film 21 generates steps between a region (FIG. 14) in which the first gap layers 28 is formed and a region (FIG. 13) in which the first gap layer 28 is not formed. As a result, the surface of the back gap layer 71 formed on the multilayer film 21 provided with the first gap layer 28 thereon is higher than that of the back gap layer 71 formed on the multilayer film 21 provided with no first gap layers 28.

Next, in the steps shown in FIGS. 13 and 14, the resist layer 60 is removed, and the magnetic sensor is milled from the left side in the figure to the place indicated by a two-dot chain line. The face obtained by the milling along the two-dot chain line in the direction parallel to the X-Z plane in the figure becomes the "face facing a recording medium".

Heretofore, the present invention has been described with reference to the preferred embodiments; however, various modifications may be made without departing from the spirit and the scope of the present invention.

In addition, the above embodiments have been described by way of example, and the present invention is not limited thereto at all.

According to the present invention described in detail, first of all, the first gap layers with the predetermined gap provided therebetween are formed on the upper surface of the multilayer film formed on the lower electrode layer. In the following step, the two end surfaces of the multilayer film and the first gap layers in the track width direction are milled.

Hence, according to the method for manufacturing a magnetic sensor of the present invention, unlike the case in the past, the adhesion of a magnetic powder generated by milling the two end surfaces of the multilayer film will not be a problem when the first gap layers are formed. In addition, since an opening portion extending to the multilayer film is not provided in the first gap layer after the formation thereof, a problem in that the surface of the multilayer film is damaged by etching will not occur at all.

Hence, according to the present invention, the predetermined gap T1 provided between the first gap layers can be formed into a minute size with superior accuracy, the current path-squeezing structure can be easily formed, and a magnetic sensor having superior change in resistance ($\Delta R$) and reproduction output can be manufactured.

In addition, according to the present invention, since the formation of the first gap layers and the milling of the two end surfaces of the multilayer film and the first gap layers are carried out by using only one resist layer, the manufacturing process can be significantly simplified. In addition, the formation of the first gap layers and the milling of the two end surfaces of the multilayer film and the first gap layers can be carried out with superior accuracy by a so-called self-alignment technique.

Alternatively, according to the present invention, the formation of the first gap layers and the milling of the two end surfaces of the multilayer film and the first gap layers may be carried out by using different resist layers. In this case, when the width dimension of the second resist layer in the track width direction used for milling of the two end surfaces of the multilayer film and the first gap layers is smaller than the width dimension of the upper portion of the first resist layer in the track width direction used for forming the first gap layers 28, the width dimension of the multilayer film in the track width direction can be further decreased.

Accordingly, the optical track width (Opti-Tw) of the multilayer film can be decreased, and as a result, even when the current path spreads wider than the gap provided between the first gap layers in the multilayer film, the narrowing of the magnetic track width (Mgr-Tw) can be realized.

What is claimed is:

1. A method for manufacturing a magnetic sensor having a multilayer film exhibiting a magnetoresistance effect, a lower electrode layer provided at a lower side of the multilayer film, and an upper electrode layer provided at an upper side of the multilayer film, the method comprising the steps of:
   (a) forming the multilayer film at an upper side of the lower electrode layer;
   (b) forming first gap layers, having a predetermined gap provided therebetween in a track width direction, on an upper surface of the multilayer film;
   (c) milling the two sides of the multilayer film and the first gap layers in the track width direction so as to enable the multilayer film and the first gap layers to have predetermined shapes; and
   (d) forming the upper electrode layer on the first gap layers and in the predetermined gap,
   wherein, in said step (c), a mask layer having a predetermined width dimension in the track width direction is provided on the first gap layers and in the gap, parts of the first gap layers and the multilayer film in the track width direction, which are not overlapped with the mask layer, are milled, and the mask layer is then removed, and
   wherein said step (b) is performed using the same mask layer as in said step (c).

2. The method for manufacturing a magnetic sensor, according to claim 1,
   wherein the mask layer is composed of a lower portion and an upper portion, the lower portion provided with two cutaway parts at two sides thereof in the track width direction, a width dimension of the lower portion in the track width direction being smaller than that of the upper portion in the track width direction,
   in said step (b), the mask layer is formed on the upper surface of the multilayer film, and the first gap layers are formed on parts of the multilayer film which are not overlapped with the mask layer except for areas inside the cutaway parts, thereby the predetermined gap being provided between the first gap layers due to the presence of the lower portion of the mask layer, and in said step (c), parts of the first gap layers and the multilayer film in the track width direction, which are not overlapped with the upper portion of the mask layer, are milled.

3. The method for manufacturing a magnetic sensor, according to claim 1, wherein the mask layer used in said step (b) is composed of a lower portion and an upper portion, the lower portion provided with two cutaway parts at two sides thereof in the track width direction, a width dimension of the lower portion in the track width direction being smaller than that of the upper portion in the track width direction, in said step (b), the mask layer is formed on the upper surface of the multilayer film, and the first gap layers is formed on parts of the multilayer film which are not overlapped with the mask layer except for areas inside the cutaway parts, thereby the predetermined gap being provided between the first gap layers due to the presence of the lower portion of the mask layer, and the mask layer is removed, and then in said step (c), the mask layer is provided on the first gap layers and in the gap therebetween, the mask layer having a width dimension in the track width direction larger than that of the lower portion of the mask layer in the track width direction and smaller than that of the upper portion thereof, parts of the first gap layers and the multilayer film in the track width direction, which are not overlapped with the mask layer in the track width direction, are milled, and the mask layer is then removed.

4. The method for manufacturing a magnetic sensor, according to claim 3, wherein the upper portion and the lower portion of the mask layer are formed of different types of resists.

5. The method for manufacturing a magnetic sensor, according to claim 4, wherein a resist used for the lower portion of the mask layer is a material having a development speed faster than that of a resist used for the upper portion.

6. The method for manufacturing a magnetic sensor, according to claim 1, further comprising, between said step (c) and said step (d), forming gap layers different from the first gap layers on the two sides of the multilayer film and the first gap layers in the track width direction.

7. The method for manufacturing a magnetic sensor, according to claim 1, further comprising, between said step (c) and said step (d), forming second gap layers on the two sides of the multilayer film and the first gap layers in the track width direction, and forming bias layers and third gap layers on the second gap layers, wherein the upper electrode layer provided on the first gap layers and in the predetermined gap therebetween is formed in said step (d) to extend on the third gap layers.

8. The method for manufacturing a magnetic sensor, according to claim 7, wherein, between said step (c) and said step (d), the second gap layers, the bias layers, and the third gap layers are formed sequentially using a mask layer for defining the multilayer film to have a predetermined shape.

9. A method for manufacturing a magnetic sensor having a multilayer film exhibiting a magnetoresistance effect, a lower electrode layer provided at a lower side of the multilayer film, and an upper electrode layer provided at an upper side of the multilayer film, the method comprising the steps of:

(a) forming the multilayer film at an upper side of the lower electrode layer;

(b) forming first gap layers, having a predetermined gap provided therebetween in a track width direction, on an upper surface of the multilayer film;

(c) milling the two sides of the multilayer film and the first gap layers in the track width direction so as to enable the multilayer film and the first gap layers to have predetermined shapes; and (d) forming the upper electrode layer on the first gap layers and in the predetermined gap, wherein a first mask layer used in said step (b) is composed of a lower portion and an upper portion, the lower portion provided with two cutaway parts at two sides thereof in the track width direction, a width dimension of the lower portion in the track width direction being smaller than that of the upper portion in the track width direction, in said step (b), the first mask layer is formed on the upper surface of the multilayer film, and the first gap layers is formed on parts of the multilayer film which are not overlapped with the first mask layer except for areas inside the cutaway parts, thereby the predetermined gap being provided between the first gap layers due to the presence of the lower portion of the mask layer, and the first mask layer is removed, and then in said step (c), a second mask layer is provided on the first gap layers and in the gap therebetween, the second mask layer having a width dimension in the track width direction larger than that of the lower portion of the first mask layer in the track width direction and smaller than that of the upper portion thereof, parts of the first gap layers and the multilayer film in the track width direction, which are not overlapped with the second mask layer in the track width direction, are milled, and the second mask layer is then removed.

10. The method for manufacturing a magnetic sensor, according to claim 9, wherein the upper portion and the lower portion of the mask layer are formed of different types of resists.

11. The method for manufacturing a magnetic sensor, according to claim 10, wherein a resist used for the lower portion of the mask layer is a material having a development speed faster than that of a resist used for the upper portion.

12. A method for manufacturing a magnetic sensor having a multilayer film exhibiting a magnetoresistance effect, a lower electrode layer provided at a lower side of the multilayer film, and an upper electrode layer provided at an upper side of the multilayer film, the method comprising the steps of:

(a) forming the multilayer film at an upper side of the lower electrode layer;

(b) forming first gap layers, having a predetermined gap provided therebetween in a track width direction, on an upper surface of the multilayer film;

(c) milling the two sides of the multilayer film and the first gap layers in the track width direction so as to enable the multilayer film and the first gap layers to have predetermined shapes;

d) forming gap layers different from the first gap layers on the two sides of the multilayer film and the first gap layers in the track width direction; and (e) forming the upper electrode layer on the first gap layers and in the predetermined gap.

13. A method for manufacturing a magnetic sensor having a multilayer film exhibiting a magnetoresistance effect, a lower electrode layer provided at a lower side of the multilayer film, and an upper electrode layer provided at an upper side of the multilayer film, the method comprising the steps of:

(a) forming the multilayer film at an upper side of the lower electrode layer;

(b) forming first gap layers, having a predetermined gap provided therebetween in a track width direction, on an upper surface of the multilayer film;

(c) milling the two sides of the multilayer film and the first gap layers in the track width direction so as to enable the multilayer film and the first gap layers to have predetermined shapes;

(d) forming the upper electrode layer on the first gap layers and in the predetermined gap; and (e) forming, between said step (c) and said step (d), second gap layers on the two sides of the multilayer film and the first gap layers in the track width direction, and forming bias layers and third gap layers on the second gap layers, wherein the upper electrode layer provided on the first gap layers and in the predetermined gap therebetween is formed in said step (d) to extend on the third gap layers.

14. The method for manufacturing a magnetic sensor, according to claim 13, wherein, between said step (c) and said step (d), the second gap layers, the bias layers, and the third gap layers are formed sequentially using a mask layer for defining the multilayer film to have a predetermined shape.

* * * * *